United States Patent
Katou et al.

(10) Patent No.: US 11,047,768 B2
(45) Date of Patent: Jun. 29, 2021

(54) ABNORMALITY DIAGNOSIS DEVICE AND ABNORMALITY DIAGNOSIS METHOD

(71) Applicant: NTN CORPORATION, Osaka (JP)

(72) Inventors: Kouma Katou, Kuwana (JP); Hideyuki Tsutsui, Kuwana (JP); Masashi Kitai, Kuwana (JP)

(73) Assignee: NTN CORPORATION, Osaka (JP)

( * ) Notice: Subject to any disclaimer, the term of this patent is extended or adjusted under 35 U.S.C. 154(b) by 312 days.

(21) Appl. No.: 15/998,651

(22) PCT Filed: Feb. 2, 2017

(86) PCT No.: PCT/JP2017/003714
§ 371 (c)(1),
(2) Date: Aug. 16, 2018

(87) PCT Pub. No.: WO2017/145687
PCT Pub. Date: Aug. 31, 2017

(65) Prior Publication Data
US 2020/0333214 A1 Oct. 22, 2020

(30) Foreign Application Priority Data

Feb. 23, 2016 (JP) .............................. JP2016-032040
Feb. 23, 2016 (JP) .............................. JP2016-032041

(51) Int. Cl.
*G01M 13/045* (2019.01)
*G01H 1/00* (2006.01)
*F16C 19/52* (2006.01)

(52) U.S. Cl.
CPC .......... *G01M 13/045* (2013.01); *G01H 1/003* (2013.01); *F16C 19/527* (2013.01)

(58) Field of Classification Search
CPC ..... G01M 3/045; G01M 13/04; F16C 19/527; F16C 19/525; F16C 223/00; G01H 1/003
See application file for complete search history.

(56) References Cited

U.S. PATENT DOCUMENTS

| | | | |
|---|---|---|---|
| 4,448,077 A | 5/1984 | Sato et al. | |
| 6,741,544 B1 * | 5/2004 | Masaki | G11B 17/038 720/702 |
| 6,801,864 B2 * | 10/2004 | Miller | G01M 13/045 702/56 |
| 2006/0167659 A1 | 7/2006 | Miyasaka et al. | |
| 2008/0033695 A1 * | 2/2008 | Sahara | G01H 1/003 702/185 |

(Continued)

FOREIGN PATENT DOCUMENTS

| | | |
|---|---|---|
| CN | 1688874 A | 10/2005 |
| CN | 101617207 A | 12/2009 |

(Continued)

OTHER PUBLICATIONS

Chinese Office Action issued in corresponding Chinese Patent Application No. 201780012987.0, dated Jan. 6, 2020, with English translation.

(Continued)

*Primary Examiner* — Stephanie E Bloss
(74) *Attorney, Agent, or Firm* — McDermott Will & Emery LLP

(57) ABSTRACT

An abnormality diagnosis device according to the present invention detects damage to a bearing device based on vibration data on acceleration of the bearing device. The abnormality diagnosis device includes a first filter, a second filter, and a diagnosis unit. The first filter is configured to extract a first vibration waveform belonging to a frequency band from the vibration data. The second filter is configured to extract a second vibration waveform belonging to a second frequency band higher than the first frequency band from the vibration data. The diagnosis unit is configured to diagnose that there is damage to the bearing device when an evaluation value calculated by dividing a first amplitude of the vibration waveform by a second amplitude of a second vibration waveform at a time at which the first amplitude has (Continued)

occurred exceeds a determination value, the first amplitude exceeding a reference value.

7 Claims, 25 Drawing Sheets

(56) References Cited

U.S. PATENT DOCUMENTS

| | | | |
|---|---|---|---|
| 2008/0234964 A1* | 9/2008 | Miyasaka | F16C 19/527 |
| | | | 702/113 |
| 2010/0116060 A1 | 5/2010 | Murayama | |
| 2011/0041611 A1* | 2/2011 | Hofer | G01N 29/14 |
| | | | 73/579 |
| 2013/0006540 A1* | 1/2013 | Sakaguchi | F03D 17/00 |
| | | | 702/34 |
| 2013/0006551 A1* | 1/2013 | Sako | G01H 1/14 |
| | | | 702/56 |
| 2013/0167624 A1 | 7/2013 | Shoda | |
| 2015/0116131 A1 | 4/2015 | Ikeda et al. | |
| 2015/0226603 A1* | 8/2015 | Hedin | G01M 13/028 |
| | | | 702/39 |
| 2016/0050498 A1* | 2/2016 | Ogata | H04R 17/10 |
| | | | 381/190 |

FOREIGN PATENT DOCUMENTS

| | | | | |
|---|---|---|---|---|
| CN | 102713554 A | | 10/2012 | |
| CN | 102834701 A | | 12/2012 | |
| CN | 103134679 A | | 6/2013 | |
| CN | 103185670 A | | 7/2013 | |
| CN | 103745085 A | | 4/2014 | |
| CN | 104792528 A | | 7/2015 | |
| EP | 2543977 A1 | * | 1/2013 | ............ G01H 1/14 |
| JP | H04-204021 A | | 7/1992 | |
| JP | 07-218334 A | | 8/1995 | |
| JP | H08-285678 A | | 11/1996 | |
| JP | 2011-154020 A | | 8/2011 | |
| JP | 5067979 B2 | | 11/2012 | |
| JP | 2012-242336 A | | 12/2012 | |
| JP | 2013-139732 A | | 7/2013 | |
| JP | 2013-185507 A | | 9/2013 | |

OTHER PUBLICATIONS

International Search Report issued in corresponding International Patent Application No. PCT/JP2017/003714, dated Apr. 11, 2017, with English Translation.

* cited by examiner

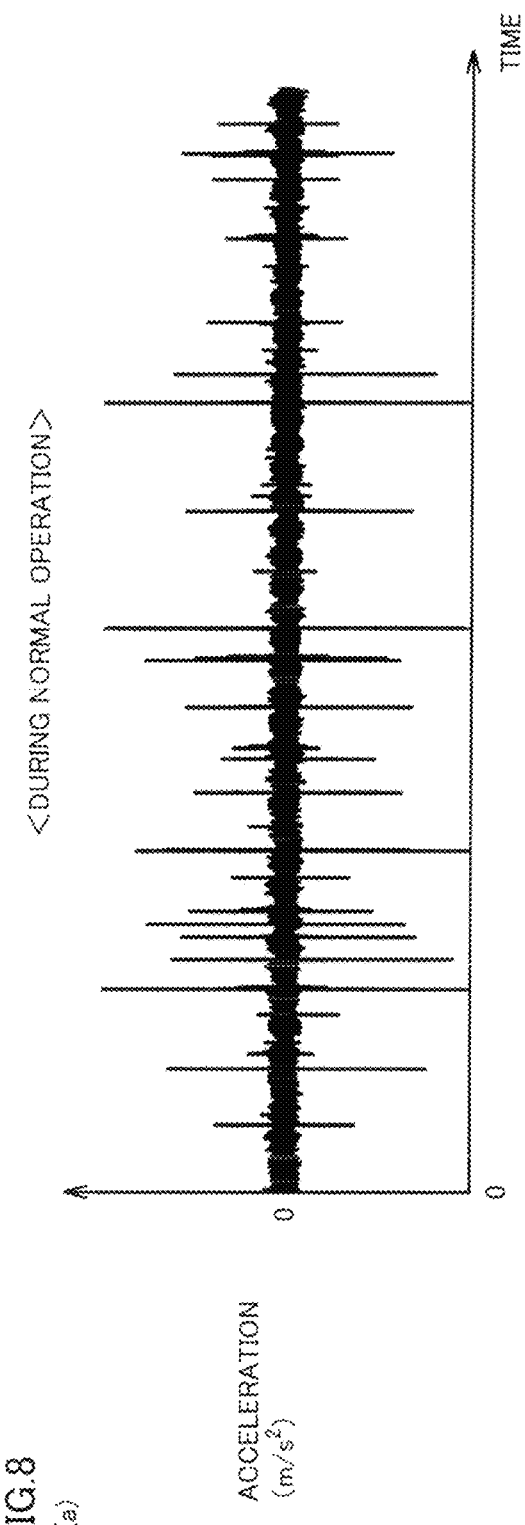
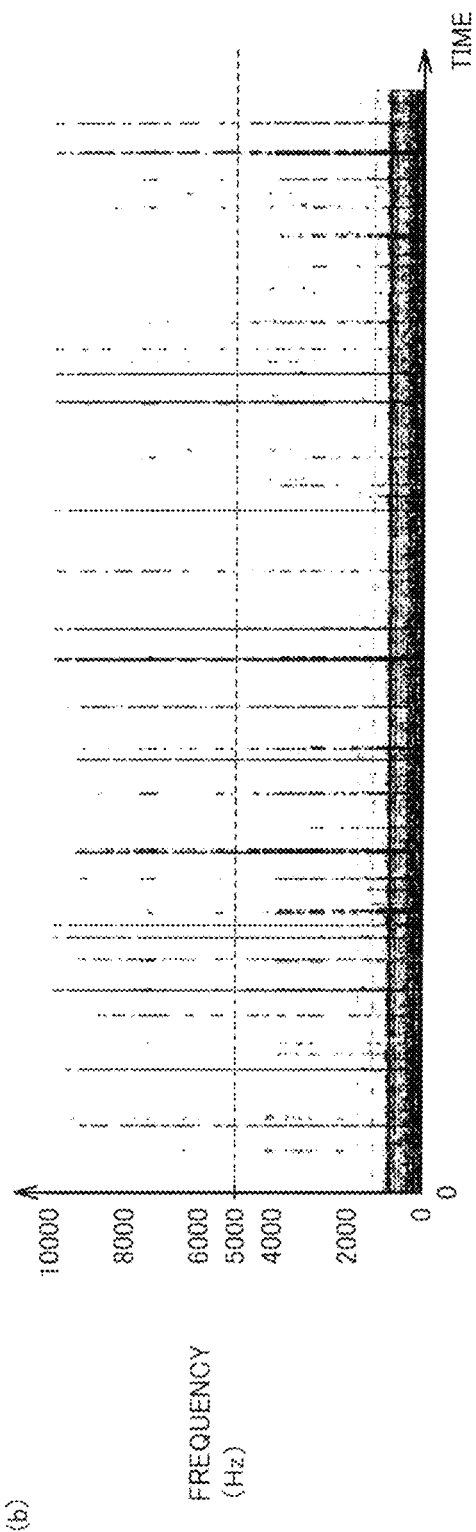
FIG. 8

FIG.9
(a) 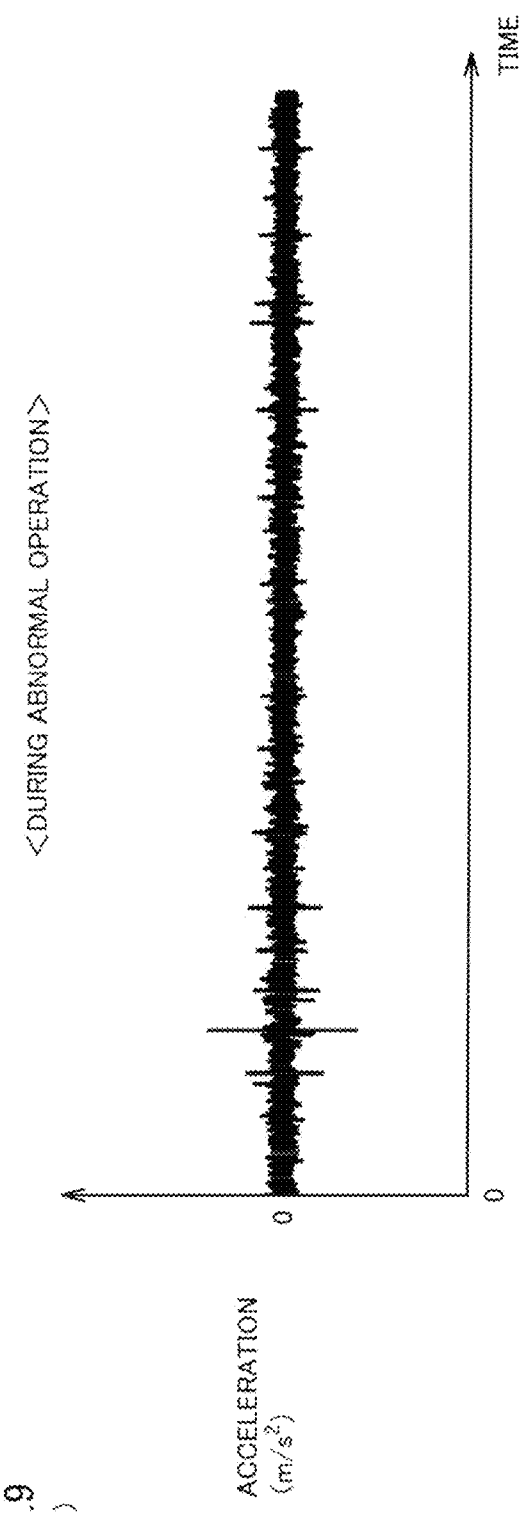
(b) 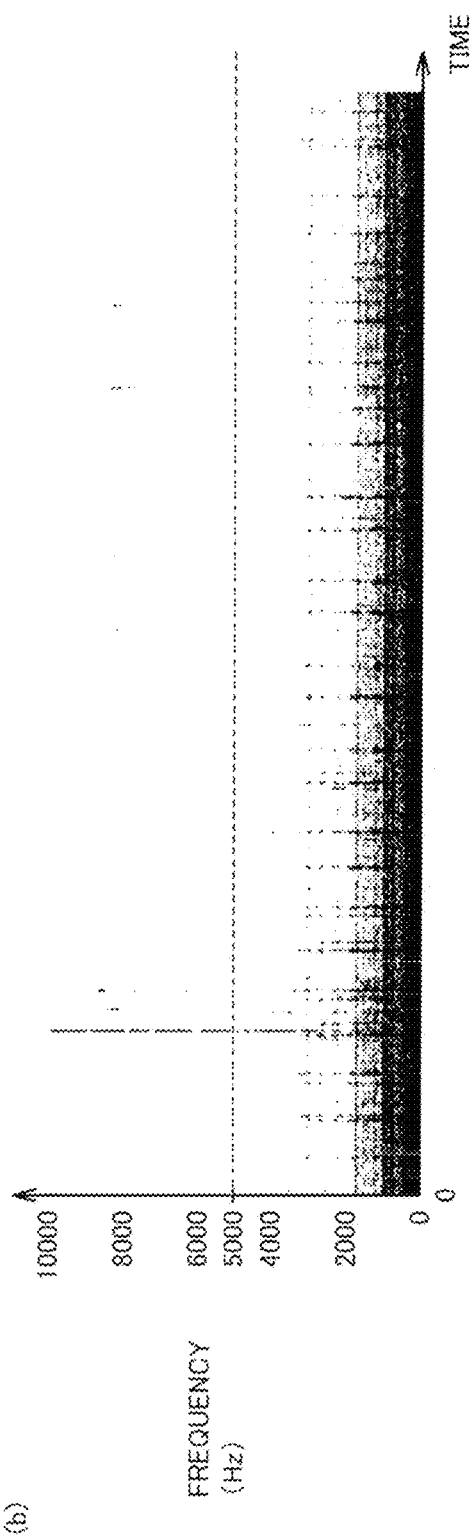

FIG.17

| DETECTION TARGET | EVALUATION VALUE | DETECTION RESULT | SIGNIFICANT DIFFERENCE |
|---|---|---|---|
| COMPARATIVE EXAMPLE | EFFECTIVE VALUE | 0.274 | NOT FOUND |
| EMBODIMENT 1 | AVERAGE OF AMPLITUDE RATIO | 9.86 | FOUND |
| EMBODIMENT 2 | OCCURRENCE FREQUENCY IN WHICH AMPLITUDE RATIO HAS EXCEEDED THRESHOLD | 11.3 | FOUND |

(NOTES) SAMPLE SIZE: 21, DEGREE OF FREEDOM: 20, RISK RATE: 5%, t(20+20, 0.05) = 2.021

FIG.23 <EMBODIMENT 3>

FIG.27

| DETECTION TARGET | EVALUATION VALUE | DETECTION RESULT | SIGNIFICANT DIFFERENCE |
|---|---|---|---|
| COMPARATIVE EXAMPLE | EFFECTIVE VALUE | 0.274 | NOT FOUND |
| EMBODIMENT 3 | NUMBER OF CASES IN WHICH AMPLITUDE RATIO HAS FELL BELOW THRESHOLD | 2.09 | FOUND |
| EMBODIMENT 4 | OCCURRENCE FREQUENCY IN WHICH AMPLITUDE RATIO HAS FELL BELOW THRESHOLD | 6.01 | FOUND |

(NOTES) SAMPLE SIZE: 21, DEGREE OF FREEDOM: 20, RISK RATE: 5%, $t(20+20, 0.05) = 2.021$

ABNORMALITY DIAGNOSIS DEVICE AND ABNORMALITY DIAGNOSIS METHOD

CROSS REFERENCE

This application is the U.S. National Phase under 35 U.S.C. § 371 of International Application No. PCT/JP2017/003714, filed on Feb. 2, 2017, which claims the benefit of Japanese Application No. 2016-032040, filed on Feb. 23, 2016 and Japanese Application No. 2016-032041, filed on Feb. 23, 2016, the entire contents of each are hereby incorporated by reference.

TECHNICAL FIELD

The present invention relates to an abnormality diagnosis device of a bearing device and a method of diagnosing an abnormality of the bearing device.

BACKGROUND ART

Japanese Patent Laying-Open No. 2013-185507 (PTD 1) discloses a condition monitoring system (CMS) capable of appropriately diagnosing an abnormality of a device provided in a wind turbine generator. The condition monitoring system uses an effective value of vibration data measured by an accelerometer fixed to a main shaft bearing to diagnose whether there is damage to the main shaft bearing.

CITATION LIST

Patent Document

PTD 1: Japanese Patent Laying-Open No. 2013-185507

SUMMARY OF INVENTION

Technical Problem

The effective value of vibration data is defined as the root mean square (RMS) of the amplitude of a waveform of vibration data. The effective value can be a target index value indicating what magnitude of amplitude is included in a waveform of vibration data.

If there is damage to the bearing device, vibrations arising from the damage may newly occur, or vibrations that have occurred during normal operation may not occur during abnormal operation. As described above, the amplitude of a waveform of vibration data can differ between during normal operation and during abnormal operation. The abnormality of the bearing device can thus be detected from vibration data using the effective value of the vibration data.

In the calculation of an effective value, generally, the amplitude of a vibration not arising from the damage is also used when the root mean square of the amplitude in the vibration data on acceleration is calculated. The amplitude of the vibration not arising from the damage hardly changes due to the presence or absence of damage. The changes in the effective value due to the presence or absence of damage nearly depend on the changes in the amplitude of vibrations arising from damage.

If there is damage to the bearing device that rotates at a low speed (e.g., about 100 rpm), such as the main shaft bearing of a wind turbine generator, changes in the acceleration arising from the damage are often small compared with a bearing device rotating at a high speed, leading to difficulty in distinguishing such changes from the changes in the acceleration not arising from the damage. Thus, the effective value hardly changes due to the presence or absence of damage. As such, when an abnormality of a bearing device rotating at a low speed is diagnosed using the effective value of vibration data on acceleration, an erroneous diagnosis may be made.

A main object of the present invention is to provide an abnormality diagnosis device and an abnormality diagnosis method capable of improving the accuracy of diagnosing an abnormality of a bearing device using vibration data on acceleration.

Solution to Problem

An abnormality diagnosis device according to a first aspect of the present invention detects damage to a bearing device based on vibration data on acceleration of the bearing device. The abnormality diagnosis device includes a first filter, a second filter, and a diagnosis unit. The first filter is configured to extract a first vibration waveform belonging to a first frequency band from the vibration data. The second filter is configured to extract a second vibration waveform belonging to a second frequency band higher than the first frequency band from the vibration data. The diagnosis unit is configured to diagnose that there is damage to the bearing device when an evaluation value calculated by dividing a first amplitude of the first vibration waveform by a second amplitude of the second vibration waveform at a time at which the first amplitude has occurred exceeds a determination value, the first amplitude exceeding a reference value.

An abnormality diagnosis device according to a second aspect of the present invention detects damage to a bearing device based on vibration data on acceleration of the bearing device. The abnormality diagnosis device includes a filter and a diagnosis unit. The filter is configured to extract a vibration waveform belonging to a predetermined frequency band from the vibration data. The diagnosis unit is configured to diagnose that there is damage to the bearing device when an evaluation value calculated by dividing a first amplitude of the vibration waveform by a second amplitude of a vibration waveform after a lapse of a predetermined period of time from a time at which the first amplitude has occurred exceeds a determination value, the first amplitude exceeding a reference value.

Advantageous Effects of Invention

According to the first aspect of the present invention, the evaluation value, calculated by dividing the first amplitude of not smaller than the reference value at a low frequency band by the second amplitude at a high frequency band at a time at which the first amplitude has occurred, is used in diagnosing an abnormality of the bearing device, enabling an abnormality diagnosis focusing on a difference in the frequency component included in the vibration data between during normal operation and during abnormal operation. This leads to an improved accuracy of diagnosing an abnormality of the bearing device.

According to the second aspect of the present invention, the value, calculated by dividing the first amplitude by the second amplitude of a vibration waveform after a lapse of a predetermined period of time from the time at which the first amplitude has occurred, is used as the evaluation value in diagnosing an abnormality of the bearing device, enabling an abnormality diagnosis focusing on a difference in the temporal waveform shape of a vibration between during normal operation and during abnormal operation. This leads to an improved accuracy of diagnosing an abnormality of the bearing device.

BRIEF DESCRIPTION OF DRAWINGS

FIG. 8 shows a waveform chart (a) of vibration data measured during normal operation and the results (b) of a short-time Fourier transform performed on the vibration data.

FIG. 9 shows a waveform chart (a) of vibration data measured during abnormal operation and the results (b) of a short-time Fourier transform performed on the vibration data.

FIG. 17 shows the results of a significant test conducted on the respective evaluation values of a comparative example, Embodiment 1, and Embodiment 2 according to the t-test.

FIG. 27 shows the results of a significant test conducted on the respective evaluation values of a comparative example, Embodiment 3, and Embodiment 4 according to the t-test.

DESCRIPTION OF EMBODIMENTS

Embodiments will be described below with reference to the drawings. In the description below, identical or corresponding parts will be indicated by identical references, and description thereof will not be repeated.

Embodiment 1

Figure 1:
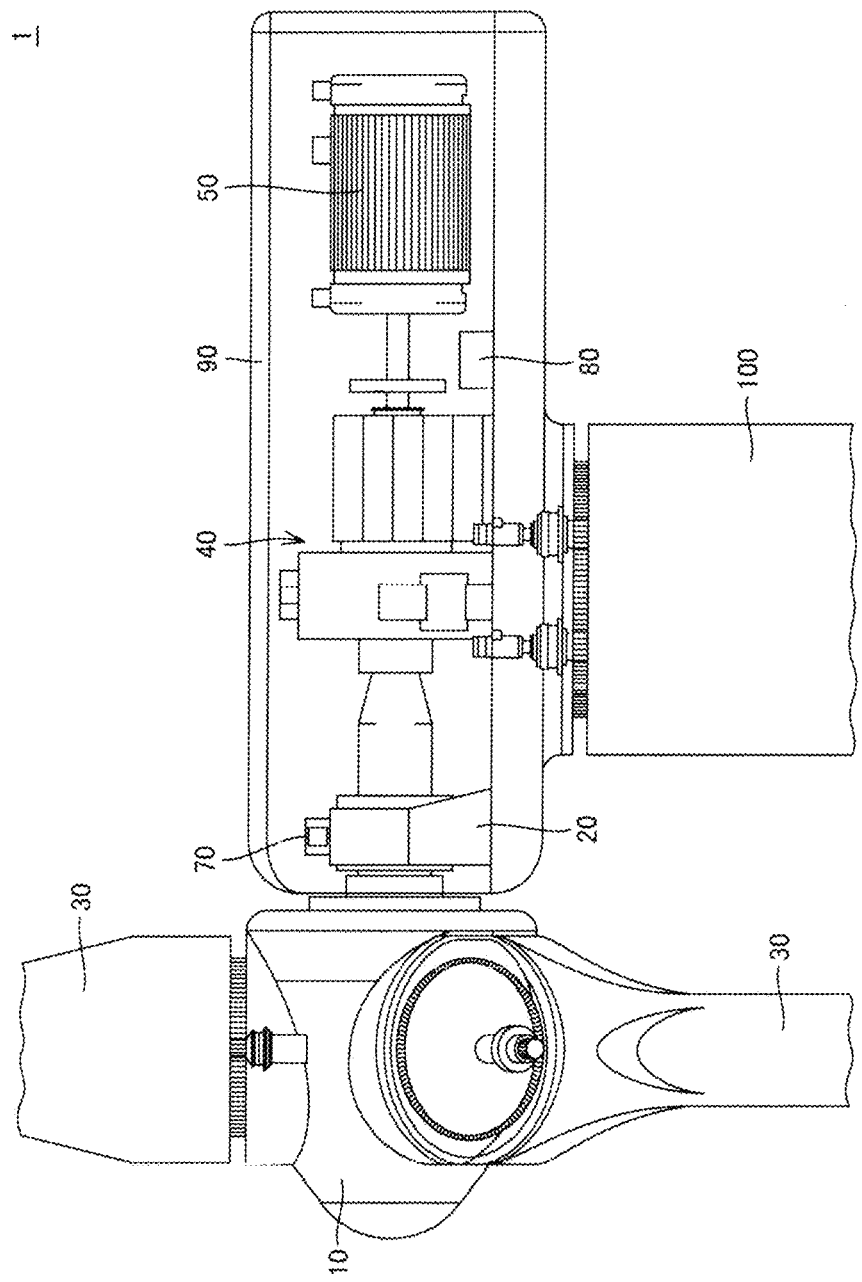
FIG. 1 schematically shows a configuration of a wind turbine generator.

FIG. 1 schematically shows a configuration of a wind turbine generator 1. As shown in FIG. 1, wind turbine generator 1 includes a main shaft 10, a main shaft bearing 20, blades 30, a speed-up gear 40, a power generator 50, an accelerometer 70, and a data processor 80. Main shaft bearing 20, speed-up gear 40, power generator 50, accelerometer 70, and data processor 80 are housed in a nacelle 90, which is supported by a tower 100.

Main shaft 10 is connected to the input shaft of speed-up gear 40 in nacelle 90. Main shaft 10 is rotatably supported by main shaft bearing 20. Main shaft 10 transmits a rotation torque generated by blades 30 subjected to winds to the input shaft of speed-up gear 40. Blades 30 are provided at the tip of main shaft 10 and convert wind power into a rotation torque, which is transmitted to main shaft 10.

Main shaft bearing 20 includes a roller bearing, for example, a self-aligning roller bearing, a conical roller bearing, a cylindrical roller bearing, or a ball bearing. Such a bearing may be a single-row or multi-row bearing.

Accelerometer 70 is arranged in main shaft bearing 20 of the main shaft and measures vibrations generated in main shaft bearing 20.

Speed-up gear 40 is provided between main shaft 10 and power generator 50, and increases the rotational speed of main shaft 10 and outputs the increased rotational speed to power generator 50. In one example, speed-up gear 40 is formed of a speed-up gear mechanism including, for example, a planetary gear, an intermediate shaft, and a high speed shaft. A plurality of bearings that rotatably support the shafts are also provided within speed-up gear 40, which are not shown. Power generator 50 is connected to the output shaft of speed-up gear 40, rotates with the rotation torque received from speed-up gear 40, and generates power. Power generator 50 includes, for example, an induction power generator. A bearing that rotatably supports the rotor is also provided within power generator 50.

Data processor 80 is provided inside nacelle 90, and receives vibration data of main shaft bearing 20 measured by accelerometer 70. Data processor 80 uses the vibration data received from accelerometer 70 to perform an abnormality diagnosis for determining whether there is damage to main shaft bearing 20. Accelerometer 70 and data processor 80 are connected via cables, which are not shown, and are configured to perform data communication. Accelerometer 70 and data processor 80 may communicate with each other through wireless communication. Data processor 80 is equivalent to the abnormality diagnosis device of the present invention.

Figure 2:
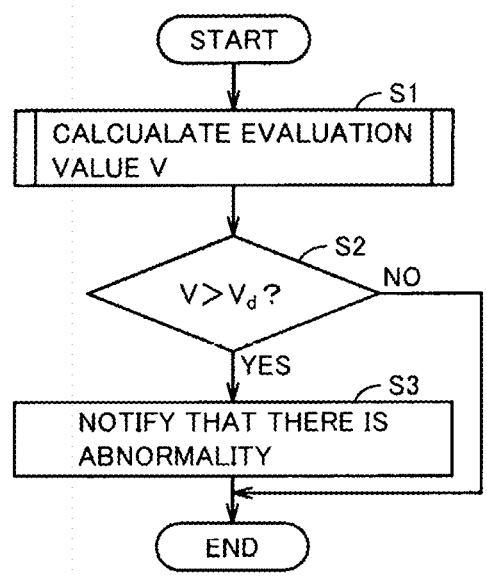
FIG. 2 is a flowchart showing a process of an abnormality diagnosis performed by a data processor.

Data processor 80 diagnoses whether there is damage to main shaft bearing 20 based on the vibration data received from accelerometer 70. FIG. 2 is a flowchart showing the process of an abnormality diagnosis performed by data processor 80. As shown in FIG. 2, in step (hereinafter, a step is merely referred to as S) S1, data processor 80 calculates an evaluation value V for diagnosing whether there is damage to main shaft bearing 20 based on the vibration data received from accelerometer 70, and then advances the process to S2. In S2, data processor 80 determines whether evaluation value V is an abnormal value. If evaluation value V is not greater than a determination value $V_d$ (NO in S2), data processor 80 determines that evaluation value V is a normal value and ends the process. If evaluation value V is greater than determination value $V_d$ (YES in S2), data processor 80 determines that evaluation value V is an abnormal value and notifies the user that there is an abnormality in main shaft bearing 20 in S3. Non-limiting examples of the notification method include an auditory method and a visual method such as voice, illumination of a lamp, and transmission of a message. Determination value $V_d$ can be appropriately determined by actual machine experiment or by simulation.

When there is an abnormality in main shaft bearing 20, the amplitude of a vibration arising from the abnormality may appear on vibration data. It is well known to use an effective value as an evaluation value V for distinguishing vibration data during normal operation from vibration data during abnormal operation by focusing on a difference in the magnitude of the amplification of the waveform of such vibration data. The effective value is defined as the root mean square of the amplitude in the waveform of vibration data. The effective value can be an index value serving as a criterion for determining what magnitude of amplitude is included in the waveform of vibration data.

Figure 3:
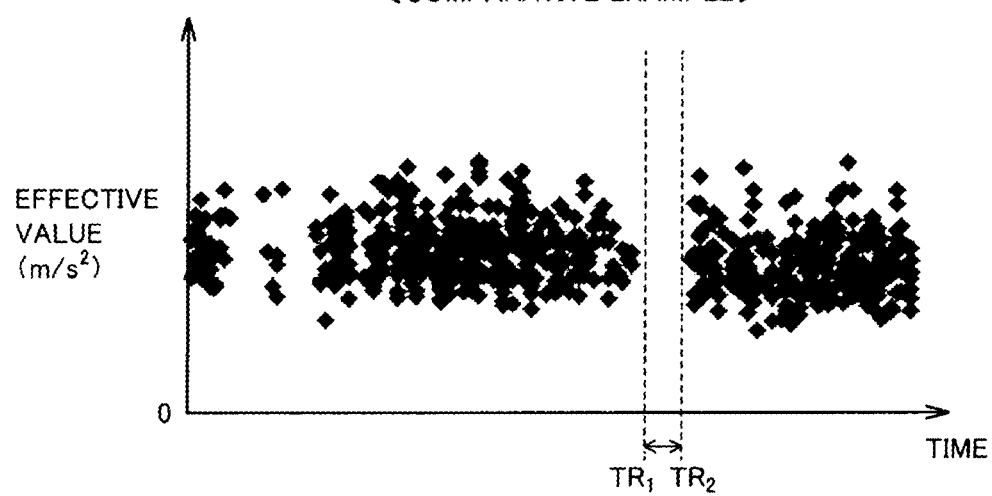
FIG. 3 shows an example of changes in the effective value of vibration data.

FIG. 3 shows an example of changes in the effective value of vibration data. In FIG. 3, up to a time $TR_1$ is an abnormal state in which there is damage to main shaft bearing 20. Main shaft bearing 20 is replaced between time $TR_1$ and a time $TR_2$, and accordingly, main shaft bearing 20 is in normal state at and after time $TR_2$. As shown in FIG. 3, the range in which the effective value is distributed at and before time $TR_1$ is substantially the same as the range in which the effective value is distributed at and after time $TR_2$. This makes it difficult to make a clear distinction between during normal operation and during abnormal operation.

In the calculation of an effective value, the amplitude of a vibration not arising from damage is also used when the average root-mean-square of the amplitude in the vibration data on acceleration is calculated. The amplitude of the vibration not arising from damage hardly changes due to the presence or absence of damage. The changes in the effective value due to the presence or absence of damage depend almost on the changes in the amplitude of the vibration arising from damage.

If there is damage to the bearing device rotating at a low speed (e.g., about 100 rpm), as in the case of main shaft bearing 20 of wind turbine generator 1, the changes in the acceleration arising from damage are often smaller than those of the bearing device rotating at a high speed, which makes it difficult to distinguish such changes from the changes in the acceleration not arising from damage. Consequently, as shown in FIG. 3, the effective value hardly changes due to the presence or absence of damage. This may lead to a misdiagnosis if an abnormality of the bearing device rotating at a low speed is diagnosed using the effective value of the vibration data on acceleration.

Considering the above, Embodiment 1 focuses on a difference in the frequency component during normal operation and during abnormal operation, which is included in the vibration caused by the collision of a rolling element with a cage, a bearing ring (an inner race or outer race), or the like.

Figure 4:
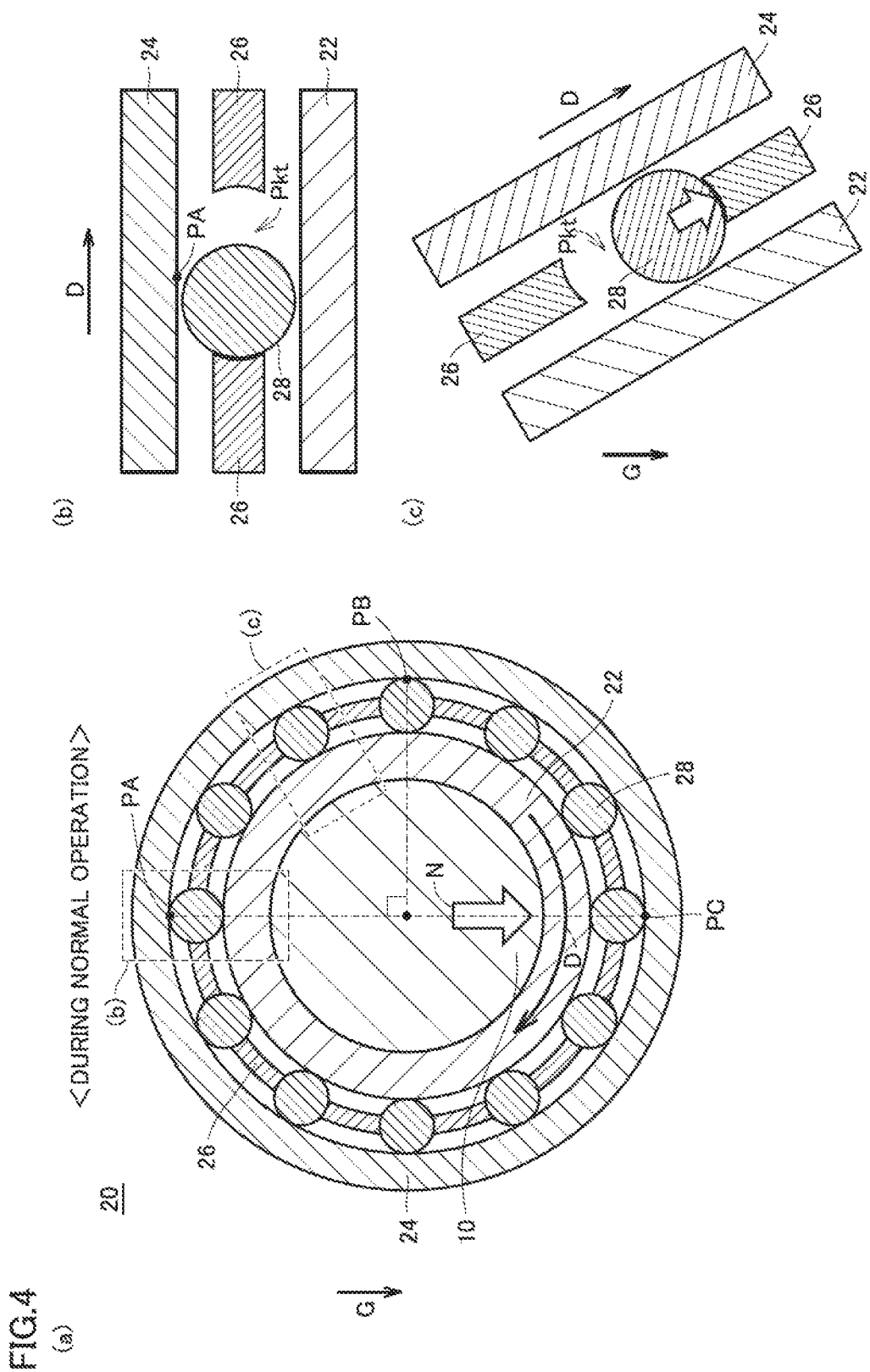
FIG. 4 shows an overall configuration of a main shaft bearing during normal operation.
Figure 5:
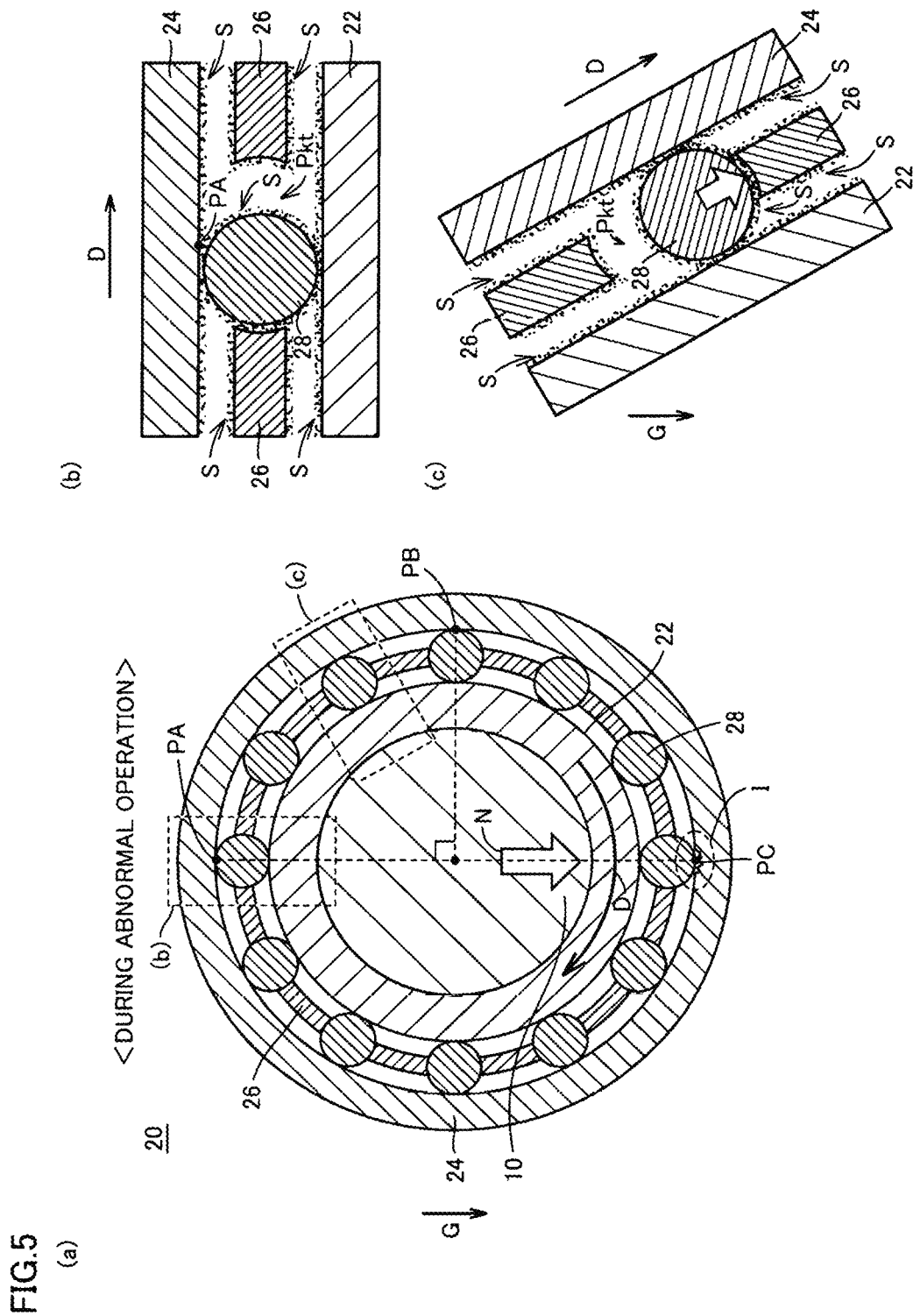
FIG. 5 shows an overall configuration of the main shaft bearing during abnormal operation.

With reference to FIGS. 4 and 5, a description will be given of why the frequency component included in a vibration generated by the collision of the rolling element with the cage, bearing ring, or the like differs between during normal operation and during abnormal operation. FIG. 4 shows an overall configuration of main shaft bearing 20 during normal operation. As shown in FIG. 4(a), main shaft bearing 20 includes an inner race 22, an outer race 24, a cage 26, and a plurality of rolling elements 28.

In FIG. 4(a), main shaft 10 rotates in the direction indicated by an arrow D. As shown in FIG. 4(a), main shaft 10 undergoes a radial load in the direction of an arrow N orthogonal to the axis of rotation of main shaft 10. An arrow G indicates the direction of the gravity. A point PA on the inner circumferential surface of outer race 24 is located vertically immediately above the axis of rotation of main shaft 10. A point PB on the inner circumferential surface of outer race 24 is located at a location rotated from the position of point PA by 90 degrees in the direction of rotation D. A point PC on the inner circumferential surface of outer race 24 is located vertically immediately below the axis of rotation of main shaft 10.

Inner race 22 is fitted onto main shaft 10 to be fixed thereto, and rotates in the direction of arrow D together with main shaft 10. Outer race 24 is provided outward relative to inner race 22.

A plurality of pockets Pkt for holding rolling elements 28 are equidistantly provided in cage 26. Cage 26 is arranged between the outer circumferential surface of inner race 22 and the inner circumferential surface of outer race 24, with rolling elements 28 held in pockets Pkt. When rolling elements 28 rotate along the outer circumferential surface of inner race 22 along with the rotation of inner race 22, cage 26 rotates between the outer circumferential surface of inner race 22 and the inner circumferential surface of outer race 24 together with rolling elements 28. Rolling elements 28 rotate between inner race 22 and outer race 24 in the direction of rotation D while being held in pockets Pkt of cage 26. As shown in FIGS. 4(b) and (c), a spacing (pocket Pkt spacing) is provided between rolling element 28 and pocket Pkt of cage 26 in which rolling element 28 is held, to allow rolling element 28 to rotate in pocket Pkt. Rolling element 28 is normally applied with a grease for a reduced friction between pocket Pkt of cage 26, inner race 22, and outer race 24.

Rolling element 28 leans in the direction opposite to the direction of rotation D within pocket Pkt due to the gravity while moving from point PC to point PA to come into contact with cage 26, and is pushed upward to point PA by cage 26. Rolling element 28 thus leans in the direction opposite to the direction of rotation D within pocket Pkt when rolling element 28 passes through point PA (see FIG. 4(b)).

After passing through point PA, rolling element 28 in the state shown in FIG. 4(b) moves within pocket Pkt under the gravity before passing through point PB, and directly collides with cage 26, inner race 22, outer race 24, or the like (see FIG. 11(c)). When rolling element 28 collides with cage 26, inner race 22, outer race 24, or the like, a vibration occurs.

FIG. 5 shows an overall configuration of main shaft bearing 20 during abnormal operation. In FIG. 5(a), there is damage I at point PC and therearound due to the abrasion caused by rolling element 28. Point PC located vertically immediately below the axis of rotation of main shaft 10 is likely to have a high radial load when rolling element 28 passes through point PC compared with any other location on the inner circumferential surface of outer race 24. Point PC undergoes a high load every time rolling element 28 passes through point PC, and accordingly, point PC is likely to be damaged.

When damage I occurs, foreign matter S such as a peel-off piece or abrasion powder adheres to inner race 22, outer nice 24, cage 26, and rolling element 28 (see FIG. 5(b)). The peel-off piece is caused by the inner circumferential surface of outer race 24 at point PC and therearound which is chipped off by rolling element 28 when, for example, damage I occurs. The abrasion powder is caused when rolling element 28 passes through damage I. When rolling element 28 passes through point PA and collides with cage 26, inner race 22, or outer race 24 in the state as described above, foreign matter S frequently exists between rolling element 28 and cage 26, inner race 22, or outer race 24 (see FIG. 5(c)). Foreign matter S lessens the impact caused when rolling element 28 collides with cage 26, inner race 22, outer race 24, or the like. The frequency component included in the vibration generated in main shaft bearing 20 when rolling element 28 collides with cage 26, inner race 22, outer race 24, or the like is lower during abnormal operation than during normal operation.

Figure 6:
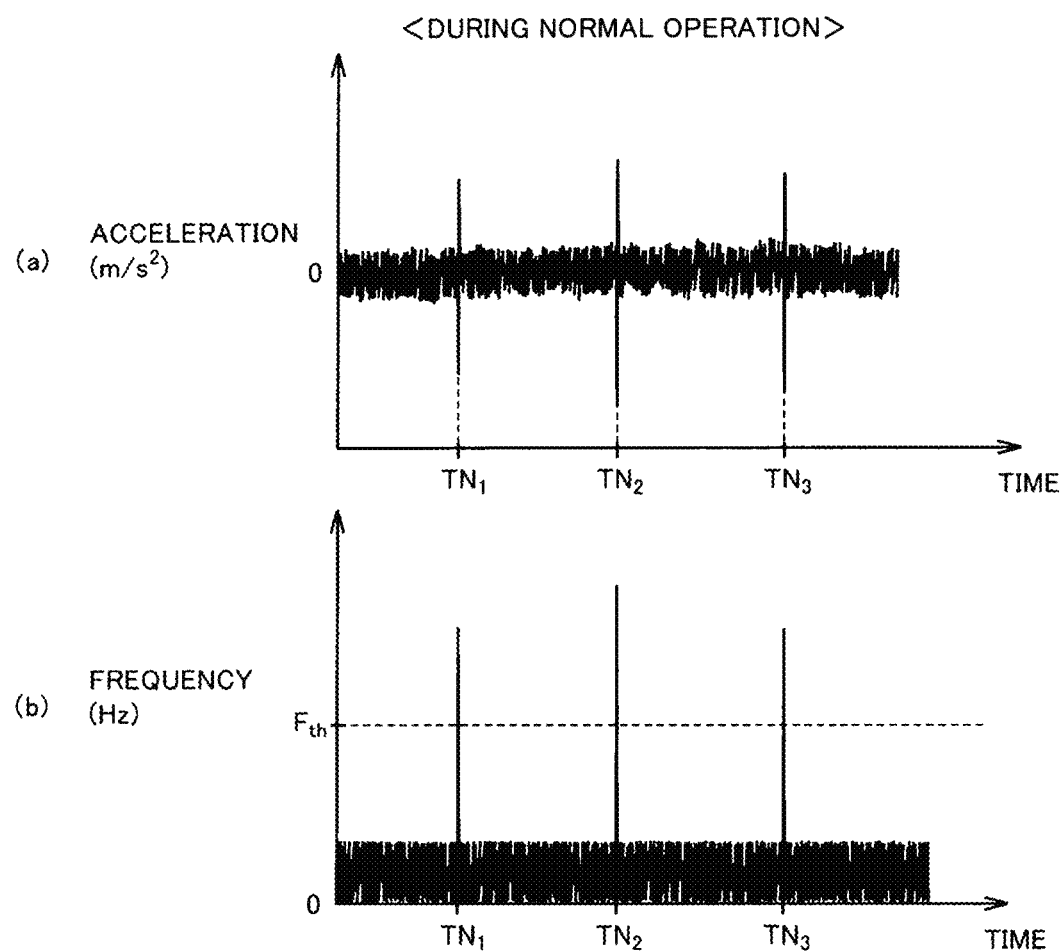
FIG. 6 shows a schematic diagram (a) of the waveforms of vibration data during normal operation and a schematic diagram (b) showing the results of a short-time Fourier transform.
Figure 7:
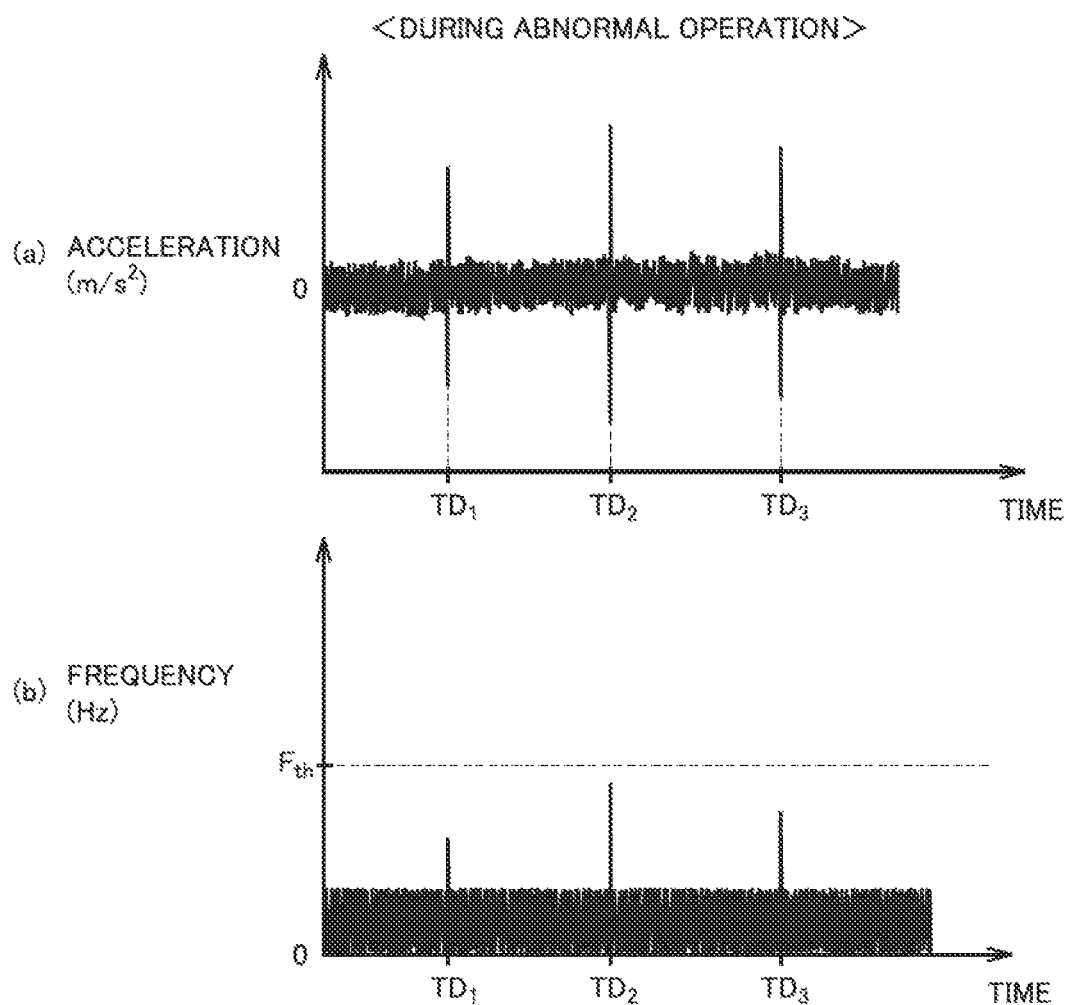
FIG. 7 shows a schematic diagram (a) of the waveforms of vibration data and a schematic diagram (b) showing the results of a short-time Fourier transform during abnormal operation.

How the frequency component included in the vibration generated when rolling element 28 collides with cage 26, inner race 22, outer race 24, or the like differs between during normal operation and during abnormal operation will be described with reference to FIGS. 6 and 7. FIG. 6 shows a schematic diagram (a) of the waveform of vibration data during normal operation and a schematic diagram (b) of the results of a short-time Fourier transform. FIG. 7 shows a schematic diagram (a) of the waveform of vibration data during abnormal operation and a schematic diagram (b) of the results of a short-time Fourier transform. In the short-time Fourier transform, vibration data is divided at predetermine time intervals and is subjected to a fast Fourier transform (FFT).

With reference to FIG. 6(a), rolling element 28 collides with cage 26, inner race 22, outer race 24, or the like at each of times $TN_1$ to $TN_3$. With reference to FIG. 7(a), rolling element 28 collides with cage 26, inner race 22, outer race 24, or the like at each of times $TD_1$ to $TD_3$.

As shown in FIG. 6(b), the frequency components at times $TN_1$ to $TN_3$ exceed a frequency $F_{th}$. In contrast, as shown in FIG. 7(b), the frequency components at times $TD_1$ to $TD_3$ fall below frequency $F_{th}$. As described above, the frequency component included in the vibration generated when rolling element 28 collides with cage 26, inner race 22, outer race 24, or the like can be clearly distinguished between during normal operation and during abnormal operation.

How the frequency component included in vibration data actually measured differs between during normal operation and during abnormal operation will be described with reference to FIGS. 8 and 9. FIG. 8 shows a waveform chart (a) of the vibration data measured during normal operation and the results (b) of a short-time Fourier transform performed on the vibration data. FIG. 9 shows a waveform chart (a) of vibration data measured during abnormal operation and the results (b) of a short-time Fourier transform performed on the vibration data. Each of FIGS. 8(b) and 9(b) shows the results of a fast Fourier transform (FFT) performed on 40-minute vibration data at intervals of 0.1 seconds.

In FIGS. 8(b) and 9(b), the horizontal axis represents a time, and the vertical axis represents a frequency component. In FIGS. 8(b) and 9(b), frequency components whose power spectral density is greater than a predetermined threshold are plotted in order to extract the frequency band to be noticed in abnormality diagnosis. The power spectral density is equivalent to the intensity of a signal corresponding to each frequency component in a spectrum that is the result of FFT. Since the frequency component whose power spectral density is not greater than the threshold is unlikely to be considered as the frequency component of the vibration caused by the collision of rolling element 28 with cage 26, inner race 22, outer race 24, or the like, it is not plotted in FIGS. 8(b) and 9(b).

The comparison between FIGS. 8(b) and 9(b) shows that times at which the frequency component included in the vibration data exceeds 5000 Hz are more during normal operation (FIG. 8(b)) than during abnormal operation (FIG. 9(b)), and such times hardly exist during abnormal operation. In contrast, a frequency component of not greater than 5000 Hz is included in most of the times during normal operation as well as during abnormal operation. In other words, the ratio of the frequency components exceeding 5000 Hz is dramatically lower than the ratio of frequency components of not greater than 5000 Hz during abnormal operation. As a result of a remarkable decrease in the frequency components exceeding 5000 Hz during abnormal operation, a value (amplitude ratio) obtained by dividing the ratio of the frequency components of not greater than 5000 Hz by the ratio of the frequency components exceeding 5000 Hz in vibration data is greater during abnormal operation than during normal operation.

In Embodiment 1, considering the above, a first vibration waveform of 500 to 5000 Hz and a second vibration waveform of 5000 to 10000 Hz are extracted from vibration data. Then, an average of the value, which is obtained by dividing the first amplitude exceeding a reference value at the first vibration waveform (500 to 5000 Hz) by the second amplitude of the second vibration waveform (5000 to 10000 Hz) at a time at which the first amplitude has occurred, is used as an evaluation value for abnormality diagnosis. The use of the value calculated by dividing the first amplitude by the second amplitude at a time at the occurrence of the first amplitude as the evaluation value allows an abnormality diagnosis focusing on a difference in the frequency component included in vibration data between during normal operation and during abnormal operation. This improves the accuracy of diagnosing an abnormality of main shaft bearing 20.

Figure 10:
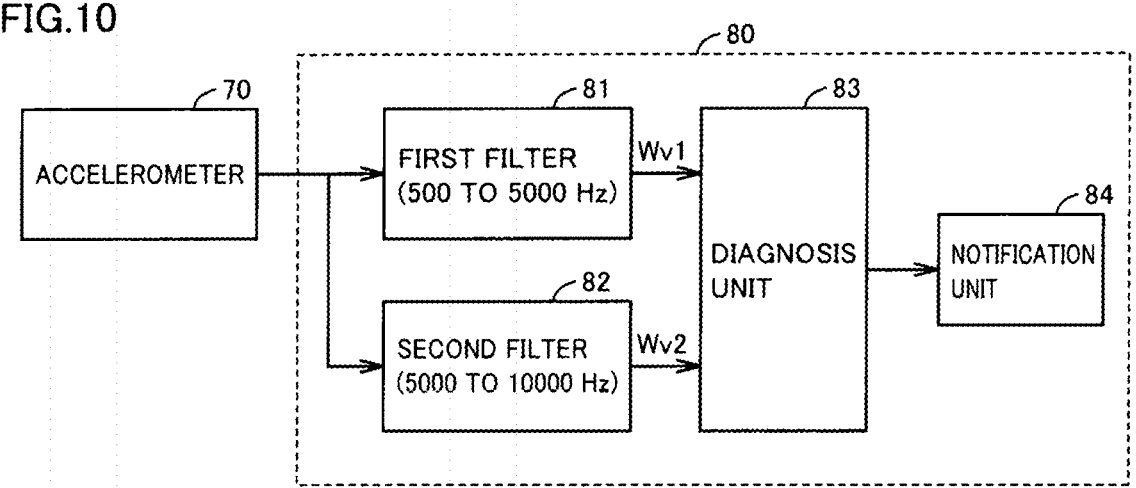
FIG. 10 is a functional block diagram for illustrating a functional configuration of a data processor that performs an abnormality diagnosis.

FIG. 10 is a functional block diagram for illustrating the functional configuration of data processor 80 that diagnoses an abnormality. As shown in FIG. 10, data processor 80 includes a first filter 81, a second filter 82, and a diagnosis unit 83. First filter 81 and second filter 82 receive inputs of vibration data measured by accelerometer 70. First filter 81 and second filter 82 may receive vibration data from accelerometer 70 in real time or may read the vibration data stored in a memory (not shown) from the memory.

First filter 81 extracts a first vibration waveform Wv1 of 500 to 5000 Hz from vibration data and outputs it to diagnosis unit 83. First filter 81 includes, for example, a bandpass filter.

Second filter 82 extracts a second vibration waveform Wv2 of 5000 to 10000 Hz from vibration data and outputs it to diagnosis unit 83. Second filter 82 includes, for example, a bandpass filter.

Diagnosis unit 83 includes a computer such as a central processing unit (CPU), and a volatile memory and a non-volatile memory for storing data required for an abnormality diagnosis. Diagnosis unit 83 receives first vibration waveform Wv1 and second vibration waveform Wv2 and performs an abnormality diagnosis for determining whether there is damage to main shaft bearing 20. When determining that there is an abnormality in main shaft bearing 20, diagnosis unit 83 controls a notification unit 84 to notify the user that there is an abnormality in main shaft bearing 20.

In abnormality diagnosis, diagnosis unit 83 extracts a first amplitude exceeding a reference value E at first vibration waveform Wv1 (500 to 5000 Hz). The reason why the amplitude exceeding reference value E is extracted from first vibration waveform Wv1 as described above is that a time at which rolling element 28 has collided with cage 26, inner race 22, outer race 24, or the like is to be identified. The changes in the acceleration generated when rolling element 28 collides with cage 26, inner race 22, outer race 24, or the like appear relatively large at the waveform of vibration data due to the impact of the collision. Thus, extracting the amplitude exceeding reference value E from first vibration waveform Wv1 can identify a time at which rolling element 28 has collided with cage 26, inner race 22, outer race 24, or the like.

The frequency component included in the vibration generated when rolling element 28 collides with cage 26, inner race 22, outer race 24, or the like differs greatly depending on whether foreign matter S exists between rolling element 28 and cage 26, inner race 22, outer race 24, or the like (see FIGS. 4(c) and 5(c)). Thus, identifying a time at which rolling element 28 has collided with cage 26, inner race 22, outer race 24, or the like can extract the amplitude arising from an abnormality from vibration data. Consequently, the amplitude little irrelevant to the collision of rolling element 28 with cage 26, inner race 22, outer race 24, or the like can be excluded from the calculation of an evaluation value.

Reference value E in the extraction of the first amplitude is desirably a value that is hardly exceeded by the amplitude generated irrelevant to the collision of rolling element 28 with cage 26, inner race 22, outer race 24, or the like. Reference value E can be appropriately determined by actual machine experiment or by simulation, which can be set to, for example, about five times the effective value of first vibration waveform Wv1.

Figure 11:
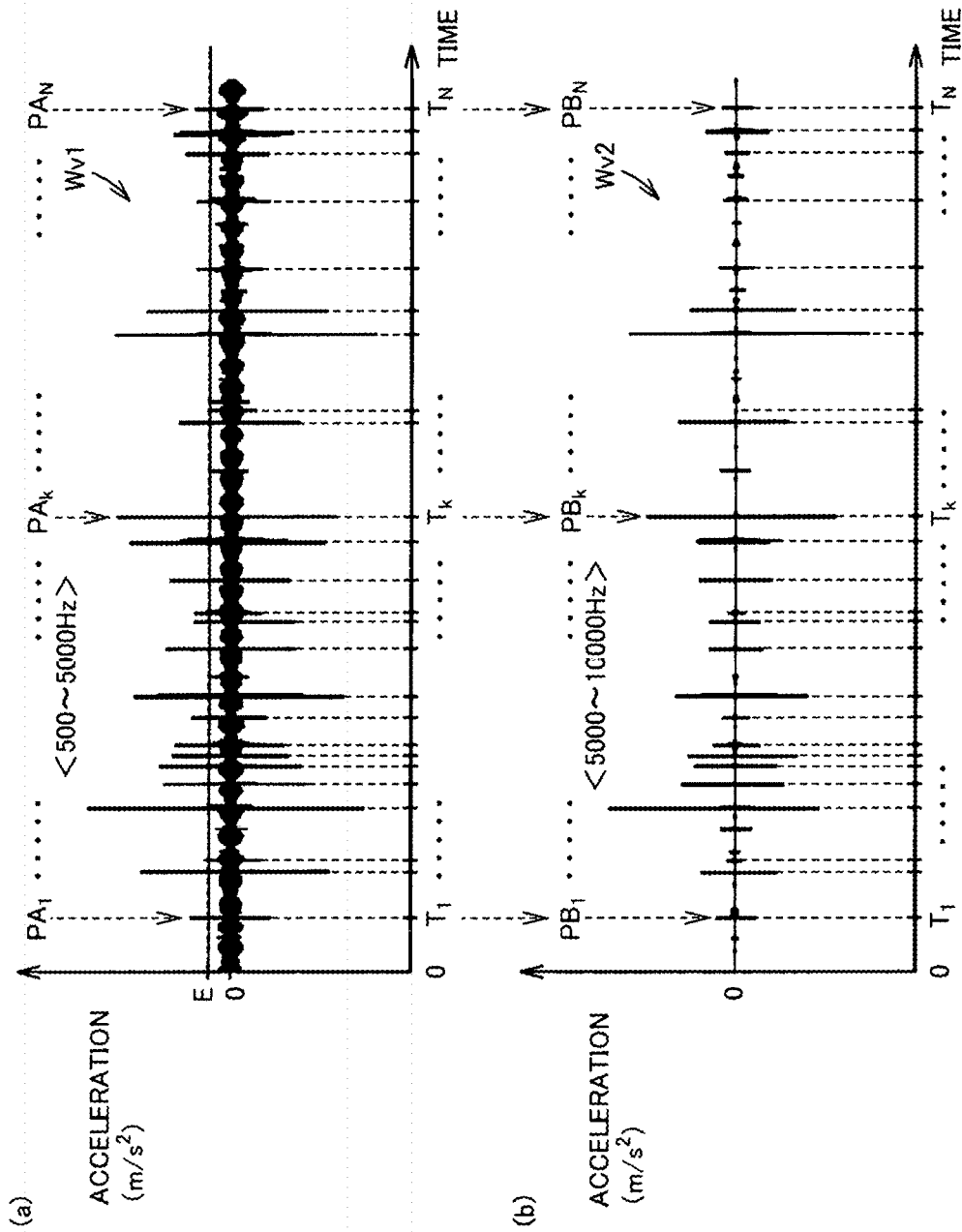
FIG. 11 shows a first vibration waveform and a second vibration waveform during normal operation.

FIG. 11 shows first vibration waveform Wv1 and second vibration waveform Wv2 during normal operation. First vibration waveform Wv1 shown in FIG. 11(a) is a waveform extracted from the vibration data shown in FIG. 8(a) by first filter 81 of FIG. 10. Second vibration waveform Wv2 shown in FIG. 11(b) is a waveform extracted from the vibration data shown in FIG. 8(a) by second filter 82 of FIG. 10.

As shown in FIG. 11(a), a first amplitude $PA_k$ exceeding reference value E has occurred at time $T_k$ (k=1 to N) during normal operation. As shown in FIG. 11(b), a second amplitude $PB_k$ generated at time $T_k$ at second vibration waveform Wv2 is extracted. In the abnormality diagnosis in Embodiment 1, an average of the value obtained by dividing first amplitude $PA_k$ by second amplitude $PB_k$ is used as the evaluation value for determining whether there is an abnormality.

Figure 12:
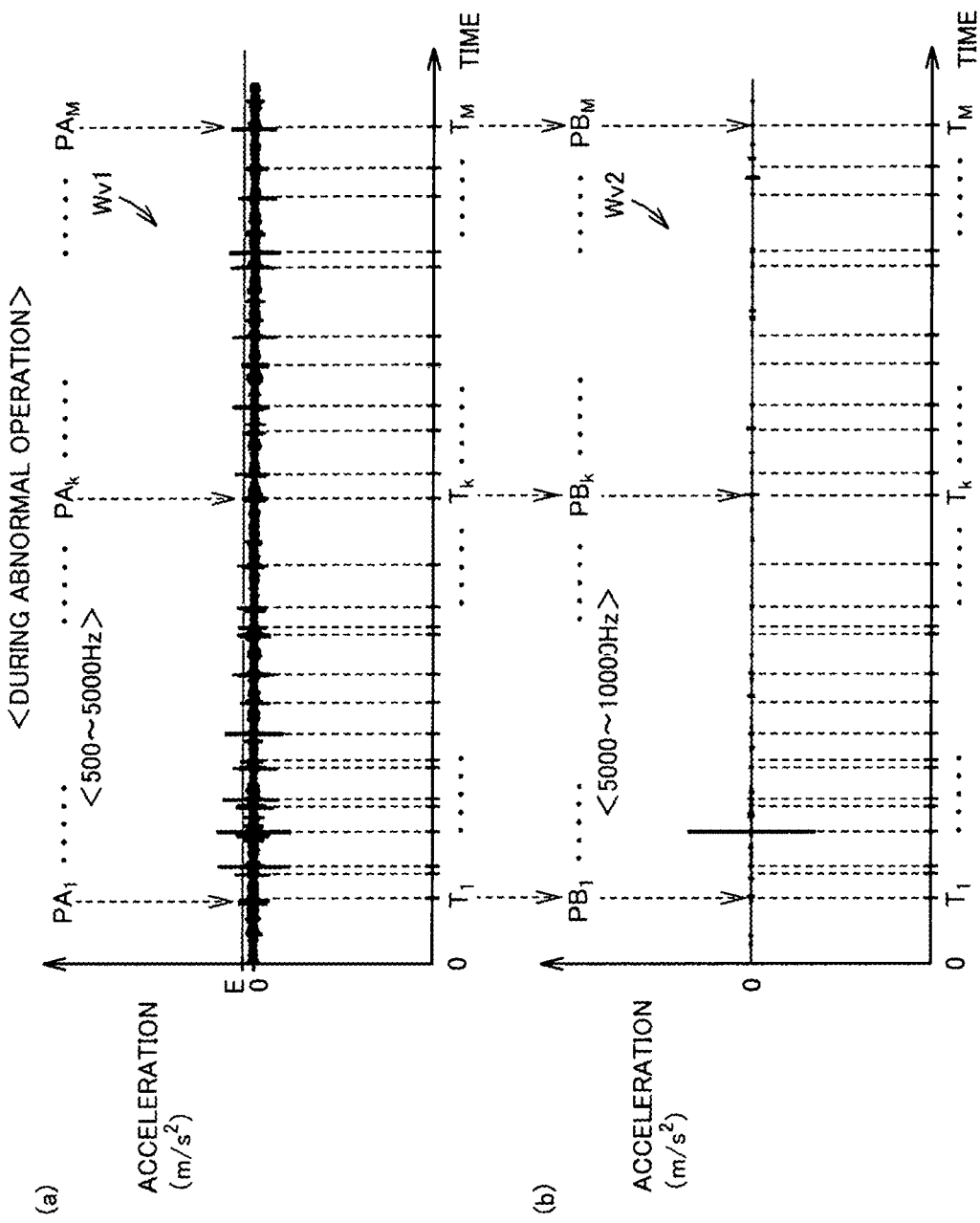
FIG. 12 shows a first vibration waveform and a second vibration waveform during abnormal operation.

FIG. 12 shows first vibration waveform Wv1 and second vibration waveform Wv2 during abnormal operation. First vibration waveform Wv1 shown in FIG. 12(a) is a waveform extracted from the vibration data shown in FIG. 9(a) by first filter 81 of FIG. 10. Second vibration waveform Wv2 shown in FIG. 12(b) is a waveform extracted from the vibration data shown in FIG. 9(a) by second filter 82 of FIG. 10. Also in FIG. 12, first amplitude $PA_k$ and second amplitude $PB_k$ are extracted, and an average of the value obtained by dividing first amplitude $PA_k$ by second amplitude $PB_k$ is used as an evaluation value, as in FIG. 11.

Figure 13:
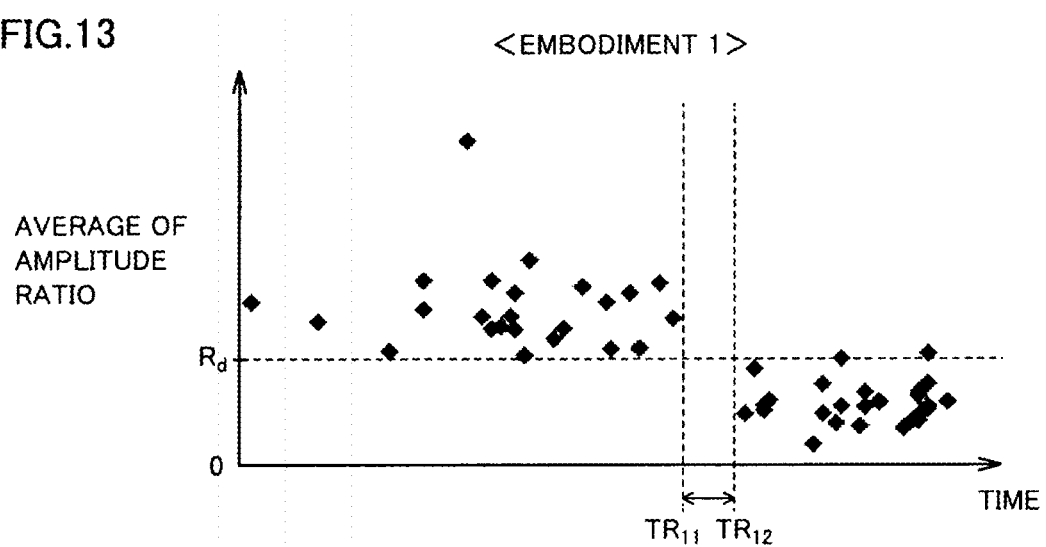
FIG. 13 shows changes in the average of a value obtained by dividing a first amplitude by a second amplitude.

FIG. 13 shows changes in the average of the value obtained by dividing first amplitude $PA_k$ by second amplitude $PB_k$. In FIG. 13, up to a time $TR_{11}$ is an abnormal state in which there is damage to main shaft bearing 20. Main shaft bearing 20 is replaced during time $TR_{11}$ and a time $TR_{12}$, and accordingly, main shaft bearing 20 is in normal operation at and after time $TR_{12}$. For example, a clear distinction can be made between during normal operation and during abnormal operation by determining the case in which evaluation value V exceeds determination value $V_d$ as the abnormal operation and the case in which evaluation value V is not greater than determination value $V_d$ as the normal operation, where a value $R_d$ is determination value $V_d$. This results in a more improved accuracy of abnormality diagnosis than that of the comparative example.

Figure 14:
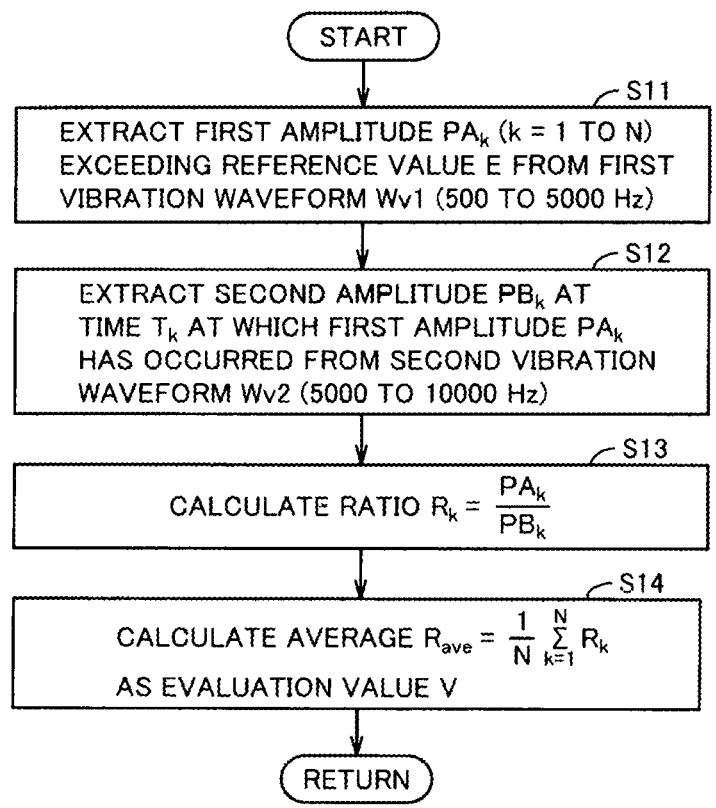
FIG. 14 is a flowchart for illustrating a process of a subroutine for calculating an evaluation value used in Embodiment 1.

FIG. 14 is a flowchart for illustrating a process (S1 in FIG. 2) of a subroutine for calculating evaluation value V used in Embodiment 1. As shown in FIG. 14, data processor 80 extracts a first amplitude $PA_k$ (k=1 to N) exceeding reference value E from first vibration waveform Wv1 (500 to 5000 Hz) in S11, and then advances the process to S12. Data processor 80 extracts a second amplitude $PB_k$ at a time $T_k$ at which first amplitude $PA_k$ has occurred from second vibration waveform Wv2 (5000 to 10000 Hz) in S12, and then advances the process to S13. Data processor 80 calculates a value $R_k = PA_k/PB_k$ (k=1 to N) obtained by dividing first amplitude $PA_k$ by second amplitude $PB_k$ in S13, and then advances the process to S14. Data processor 80 calculates an average $R_{ave}$ of radio $R_k$ as evaluation value V in step S14, and then returns the process to a main routine for performing an abnormality diagnosis shown in FIG. 2. If evaluation value V is greater than determination value $V_d$, data processor 80 notifies the user that there is an abnormality.

In Embodiment 1, as described above, an average of the value, obtained by dividing first amplitude $PA_k$ of not smaller than reference value E at 500 to 5000 Hz by second amplitude $PB_k$ at 5000 to 10000 Hz at a time at which first amplitude $PA_k$ has occurred, is used as evaluation value V in diagnosing an abnormality of main shaft bearing 20. This leads to a remarkably large evaluation value V during abnormal operation in which hardly any second amplitude $PB_k$ is found in vibration data, resulting in an improved accuracy of diagnosing an abnormality of main shaft bearing 20.

Embodiment 2

Embodiment 1 has described the case in which an average of the value obtained by dividing the first amplitude by the second amplitude is used as the evaluation value for determining whether there is an abnormality. The evaluation value for determining whether there is an abnormality may be any value calculated by dividing the first amplitude by the second amplitude at the time at which the first amplitude has occurred. Embodiment 2 will describe the case in which an occurrence frequency in which the value obtained by dividing the first amplitude by the second amplitude exceeds a threshold is used as the evaluation value for determining whether there is an abnormality.

Embodiment 2 differs from Embodiment 1 in that an occurrence frequency in which the value obtained by dividing the first amplitude by the second amplitude exceeds the threshold is used as the evaluation value for determining whether there is an abnormality. FIGS. 13 and 14 of Embodiment 1 are replaced respectively by FIGS. 15 and 16 in Embodiment 2. The other components are similar to those of Embodiment 1, which will not be described repetitively.

Figure 15:
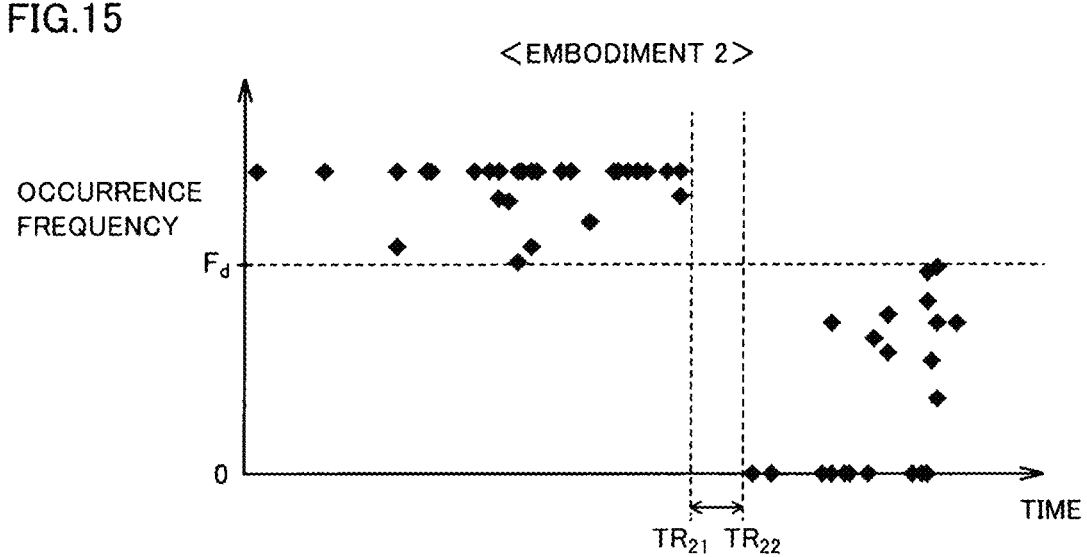
FIG. 15 shows changes in the occurrence frequency in which a value obtained by dividing a first amplitude by a second amplitude exceeds a threshold.

FIG. 15 shows changes in the occurrence frequency in which the value obtained by dividing first amplitude $PA_k$ by second amplitude $PB_k$ exceeds a threshold. In FIG. 15, up to a time $TR_{21}$ is a state in which there is an abnormality in main shaft bearing 20. Main shaft bearing 20 is replaced between time $TR_{21}$ and a time $TR_{22}$, and accordingly, main shaft bearing 20 is in normal operation at and after time $TR_{22}$. As shown in FIG. 15, a clear distinction can be made between during normal operation and during abnormal operation by, for example, determining the case in which evaluation value V exceeds determination value $V_d$ as the abnormal operation and the case in which evaluation value V is not greater than determination value $V_d$ as the normal operation, where a value $F_d$ is determination value $V_d$. This leads to a more improved accuracy of abnormality diagnosis than in the comparative example.

Figure 16:
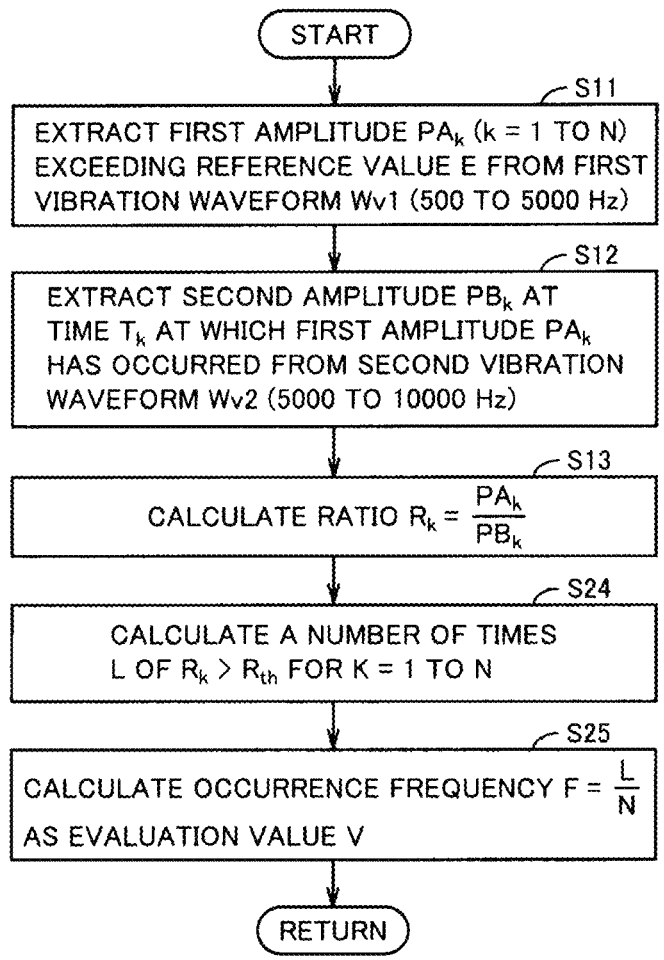
FIG. 16 is a flowchart for illustrating a process (S1 of FIG. 2) of a subroutine for calculating an evaluation value V used in Embodiment 2.

FIG. 16 is a flowchart for illustrating the process (S1 of FIG. 2) of the subroutine for calculating an evaluation value V used in Embodiment 2. As shown in FIG. 16, data processor 80 extracts a first amplitude $PA_k$ (k=1 to N) exceeding reference value E from a first vibration waveform Wv1 (500 to 5000 Hz) in S11, and then advances the process to S12. Data processor 80 extracts a second amplitude $PB_k$ at a time $T_k$ at which first amplitude $PA_k$ has occurred from a second vibration waveform Wv2 (5000 to 10000 Hz) in S12, and then advances the process to S13. Data processor 80 calculates a ratio $R_k=PA_k/PB_k$ (k=1 to N) obtained by dividing first amplitude $PA_k$ by second amplitude $PB_k$ in S13, and then advances the process to S24. Data processor 80 calculates a number of times L in which ratio $R_k$ (k=1 to N) exceeds a threshold $R_{th}$ in step S24, and then advances the process to S25. Data processor 80 calculates an occurrence frequency F=L/N as an evaluation value V in S25, and then returns the process to the main routine for processing an abnormality diagnosis shown in FIG. 2. If evaluation value V is greater than determination value $V_d$, data processor 80 notifies the user that there is an abnormality. Threshold $R_{th}$ can be appropriately obtained by simulation or by actual machine experiment.

In Embodiment 2, as described above, an occurrence frequency F in which a value, obtained by dividing first amplitude $PA_k$ of not smaller than reference value E at 500 to 5000 Hz by second amplitude $PB_k$ at 5000 to 10000 Hz at a time at which first amplitude $PA_k$ has occurred, is greater than threshold $R_{th}$ is used as evaluation value V in diagnosing an abnormality of main shaft bearing 20. This leads to a remarkably great evaluation value V during abnormal operation in which hardly any second amplitude $PB_k$ is found in vibration data, Consequently, Embodiment 2 can also improve the accuracy of diagnosing an abnormality of main shaft bearing 20.

FIG. 17 shows the results of a significant test conducted on the respective evaluation values of the comparative example, Embodiment 1, and Embodiment 2 according to the t-test. The t-test is a test method of determining whether there is a significant difference between an average of a sample group and an average of another sample group. With reference to FIG. 17, whether there is a significant difference between an average of the evaluation value when there is damage to main shaft bearing 20 and an average of the evaluation value when there is no damage to main shaft bearing 20 was determined. The sample size of each group is 21. A t-value that is a boundary value for determining whether a significant difference is found is 2.021. A significant difference is found when the result of the t-test exceeds 2.021.

As shown in FIG. 17, no significant difference is found in the comparative example because the result of the t-test is 0.274, which is smaller than the t-value. In contrast, a significant difference is found in Embodiments 1 and 2 because the results of the t-test are respectively 9.86 and 11.3, both of which exceed the t-value.

The results of the significant test reveal that a difference is more likely to occur between the evaluation value when there is no abnormality in main shaft bearing 20 and the evaluation value when there is an abnormality in main shaft bearing 20 in Embodiments 1 and 2 than in the comparative example in which the effective value is used as the evaluation value. Thus, the occurrence of an abnormality is more likely to appear as the change in evaluation value in Embodiments 1 and 2 than in the comparative example. Embodiments 1 and 2 can thus achieve an improved accuracy of abnormality diagnosis compared with the comparative example.

Embodiment 3

In Embodiment 3, a vibration waveform of 500 to 5000 Hz is extracted from vibration data, and a value (amplitude ratio), obtained by dividing a first amplitude exceeding a reference value at the vibration waveform by a second amplitude after a lapse of a predetermined period of time from a time at which the first amplitude has occurred, has fell below a threshold is used as an evaluation value for abnormality diagnosis. The use of the value, calculated from the value obtained by dividing the first amplitude by the second amplitude after a lapse of a predetermined period of time from the time at which the first amplitude has occurred, as the evaluation value enables an abnormality diagnosis focusing on a difference in the temporal waveform shape of a vibration between during normal operation and during abnormal operation. This results in an improved accuracy of diagnosing an abnormality of main shaft bearing 20.

Figure 18:
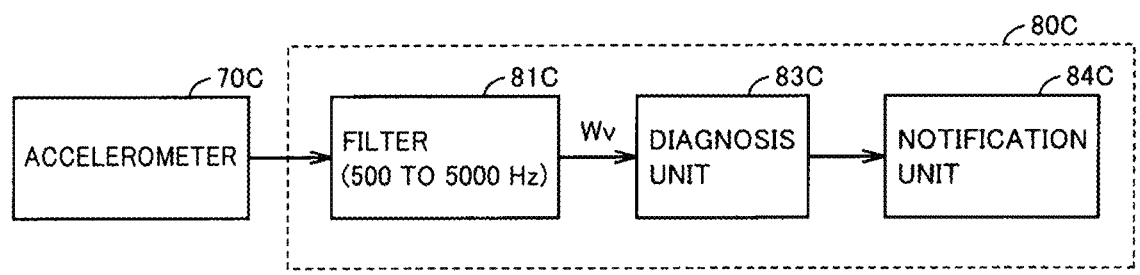
FIG. 18 is a functional block diagram for illustrating a functional configuration of a data processor that performs an abnormality diagnosis.

FIG. 18 is a functional block diagram for illustrating the functional configuration of a data processor 80C that diagnoses an abnormality. As shown in FIG. 18, data processor 80C includes a filter 81C, a diagnosis unit 83C, and a notification unit 84C. Filter 81C receives an input of vibration data measured by accelerometer 70C. Filter 81C may receive vibration data from accelerometer 70C in real time or may read the vibration data stored in a memory (not shown) from the memory.

Filter 81C extracts a vibration waveform Wv of 500 to 5000 Hz from vibration data and outputs it to diagnosis unit 83C. Filter 81C includes, for example, a bandpass filter.

Diagnosis unit 83C includes a computer such as a central processing unit (CPU) and a volatile memory and a non-volatile memory for storing data required for abnormality diagnosis. Diagnosis unit 83C receives vibration waveform Wv and diagnoses whether there is damage to main shaft bearing 20. When determining that there is damage to main shaft bearing 20, diagnosis unit 83C controls a notification unit 84C to notify the user that there is an abnormality in main shaft bearing 20.

In abnormality diagnosis, diagnosis unit 83C extracts a first amplitude exceeding a reference value E at a vibration waveform Wv (500 to 5000 Hz). The reason why the amplitude exceeding reference value E is extracted from vibration waveform Wv is that a time at which rolling element 28 has collided with cage 26, inner race 22, outer race 24, or the like is to be identified. The changes in the acceleration generated when rolling element 28 collides with cage 26, inner race 22, outer race 24, or the like appear relatively large at the waveform of vibration data due to the impact of the collision. Thus, extracting the amplitude exceeding reference value E from vibration waveform Wv identifies a time at which rolling element 28 has collided with cage 26, inner race 22, outer race 24, or the like. This allows an amplitude little irrelevant to the collision of rolling element 28 with cage 26, inner race 22, outer race 24, or the like to be excluded from the calculation of the evaluation value.

Reference value E in the extraction of a first amplitude is desirably a value that is hardly exceeded by the amplitude irrelevant to the collision of rolling element 28 with cage 26, inner race 22, outer race 24, or the like. Reference value E can be appropriately determined by actual machine experiment or by simulation, which can be set to, for example, about five times the effective value of vibration waveform Wv.

Figure 19:
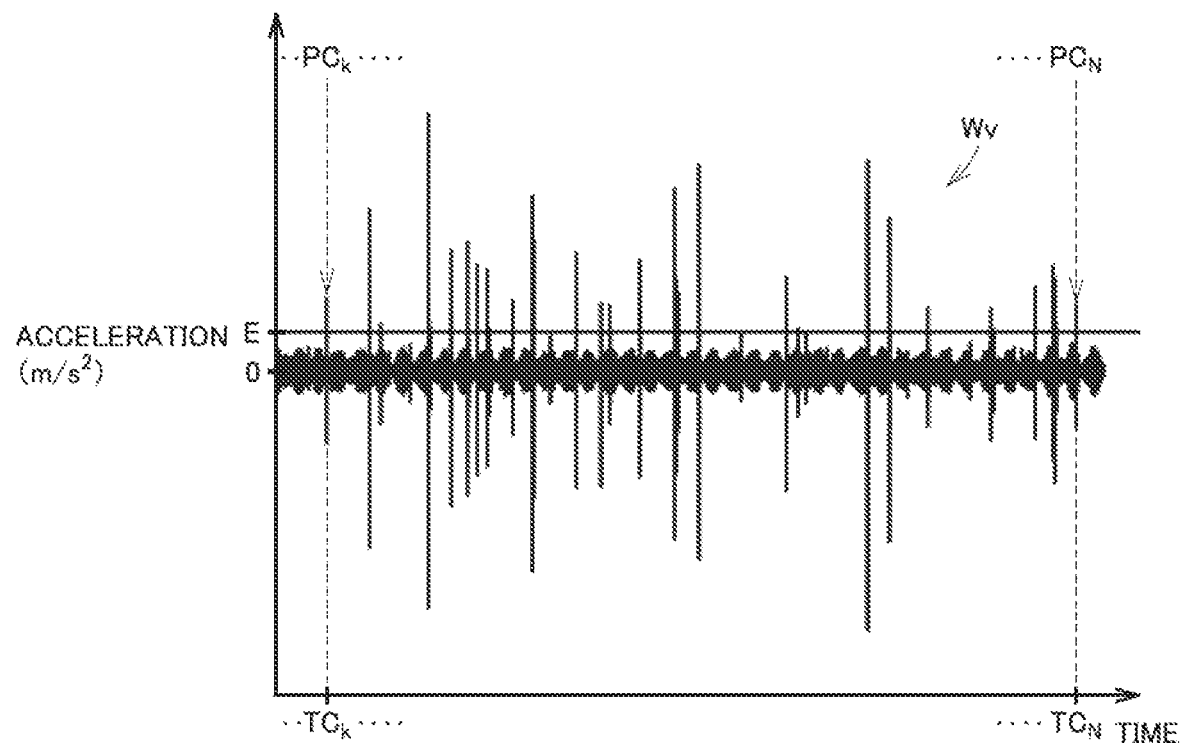
FIG. 19 shows a vibration waveform (500 to 5000 Hz) during normal operation.

FIG. 19 shows a vibration waveform Wv during normal operation. Vibration waveform Wv shown in FIG. 19 is a waveform extracted from the vibration data shown in FIG. 8(a) by filter 81C of FIG. 18. As shown in FIG. 19, a first amplitude $PC_k$ exceeding reference value E occurs at a time $TC_k$ (k=1 to N).

Figure 20:
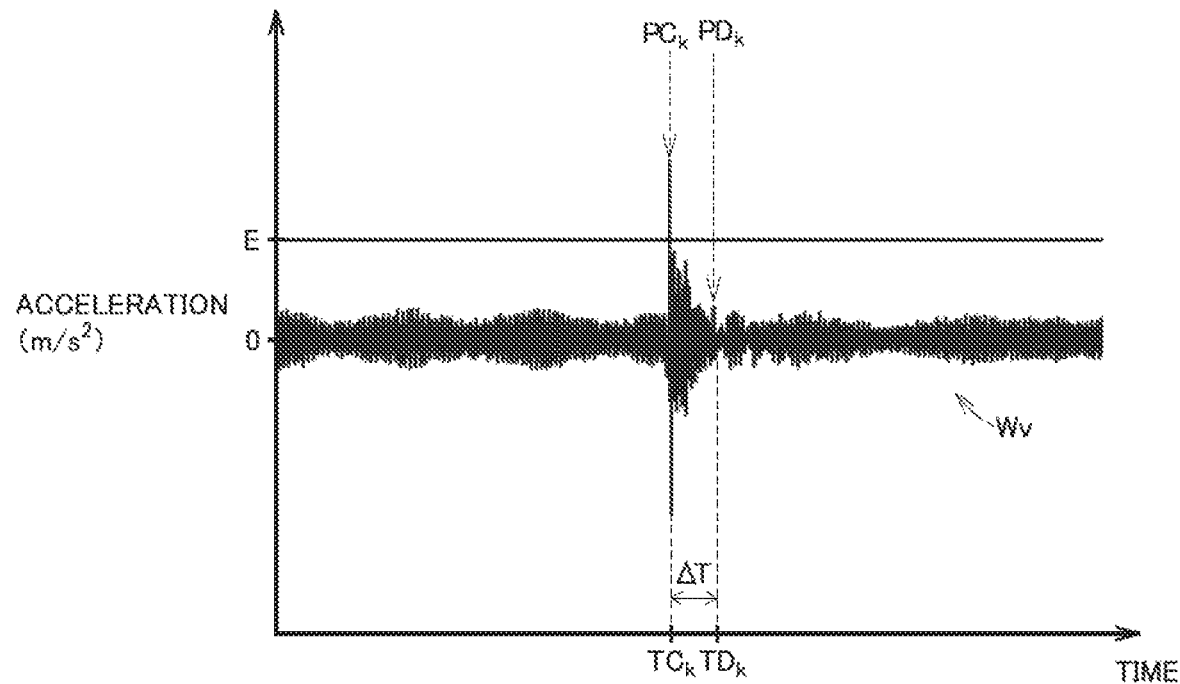
FIG. 20 shows a part of the vibration waveform shown in FIG. 19 in an enlarged manner.

FIG. 20 shows the vibration waveform Wv shown in FIG. 19 at a time $TC_k$ and therearound in an enlarged manner. As shown in FIG. 20, a second amplitude $PD_k$ has occurred at a time $TD_k$ after a lapse of a period of time $\Delta T$ from a time $TC_k$ at which first amplitude $PC_k$ has occurred. In abnormality diagnosis in Embodiment 3, a number of times in which a value obtained by dividing first amplitude $PC_k$ by second amplitude $PD_k$ has fell below threshold $R2_{th}$ is used as an evaluation value for determining whether there is an abnormality.

Figure 21:
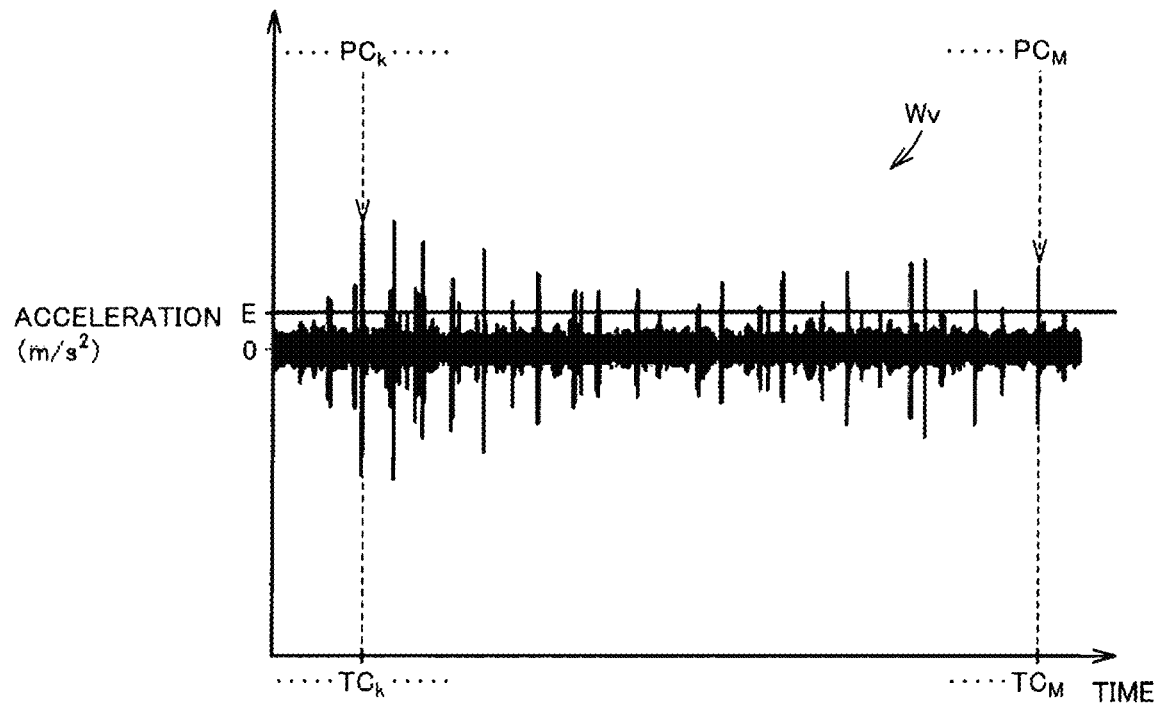
FIG. 21 shows a vibration waveform (500 to 5000 Hz) during abnormal operation.

FIG. 21 shows a vibration waveform Wv during abnormal operation. Vibration waveform Wv shown in FIG. 21 is a waveform extracted from the vibration data shown in FIG. 9(a) by filter 81C of FIG. 18. As shown in FIG. 21, a first amplitude $PC_k$ exceeding reference value E has occurred at a time $TC_k$ (k=1 to M).

Figure 22:
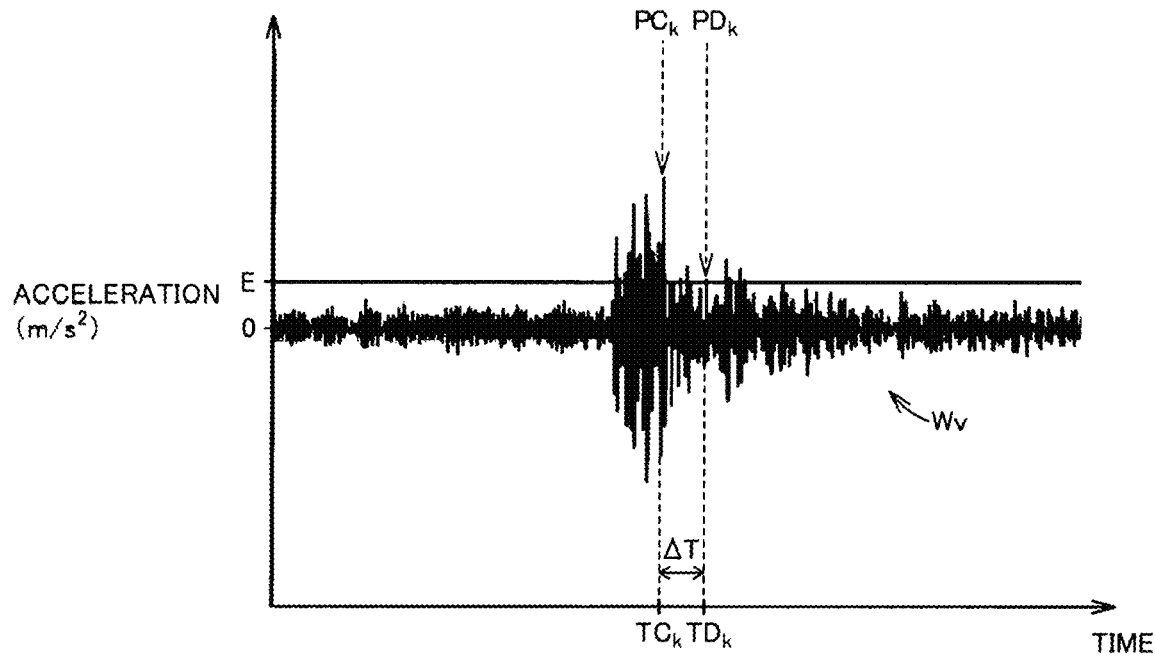
FIG. 22 shows a part of the vibration waveform shown in FIG. 21 in an enlarged manner.

FIG. 22 shows the vibration waveform Wv shown in FIG. 21 at a time $TC_k$ and therearound in an enlarged manner. As shown in FIG. 22, a second amplitude $PD_k$ has occurred at a time $TD_k$ after a lapse of a period of time $\Delta T$ from a time $TC_k$ at which first amplitude $PC_k$ has occurred. Also in FIG. 22, the number of times in which a value, obtained by dividing first amplitude $PC_k$ by second amplitude $PD_k$, has fell below threshold $R2_{th}$ is used as an evaluation value for determining whether there is an abnormality, as in FIG. 20.

A damping factor of the vibration that has occurred at a time (time $TC_k$) at which rolling element 28 has collided with cage 26, inner race 22, outer race 24, or the like is smaller during abnormal operation in which most of the vibrations occur at 500 to 5000 Hz than during normal operation. The value obtained by dividing first amplitude $PC_k$ by second amplitude $PD_k$ is accordingly smaller during abnormal operation than during normal operation.

Figure 23:
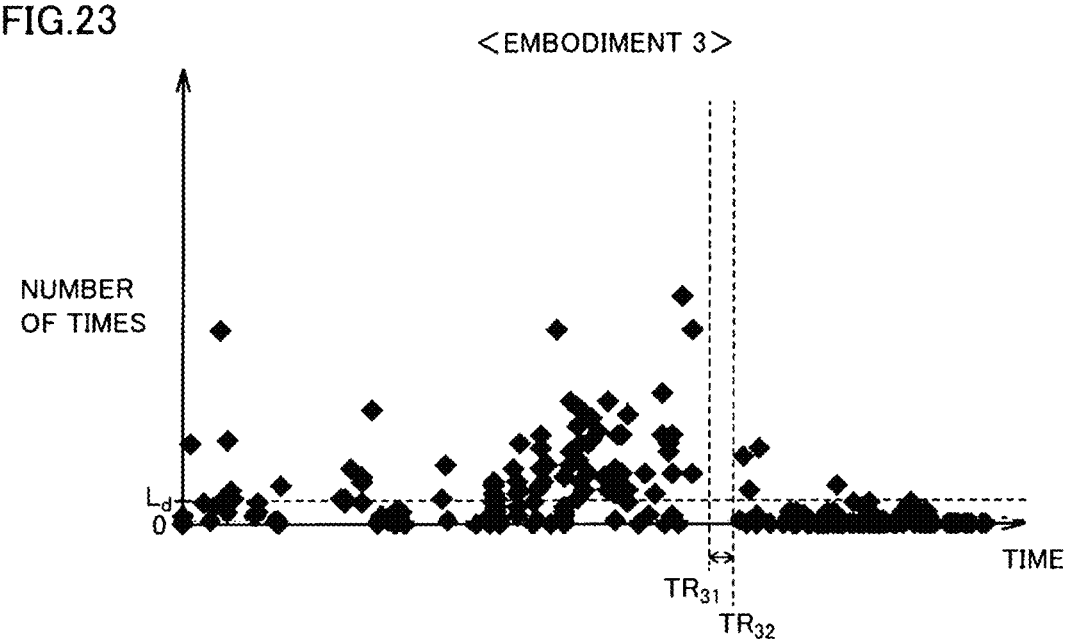
FIG. 23 shows changes in the number of times in which a value obtained by dividing the first amplitude by the second amplitude falls below a threshold.

FIG. 23 shows changes in the number of times in which the value obtained by dividing first amplitude $PC_k$ by second amplitude $PD_k$ has fell below threshold $R2_{th}$. In FIG. 23, up to a time $TR_{31}$ is an abnormal state in which there is damage to main shaft bearing 20. Main shaft bearing 20 is replaced between time $TR_{31}$ and a time $TR_{32}$, and accordingly, main shaft bearing 20 is in normal operation at and after time $TR_{32}$. A distinction can be made between during normal operation and during abnormal operation by, for example, determining the case in which evaluation value V exceeds determination value $V_d$ as the abnormal operation and the case in which evaluation value V is not greater than determination value $V_d$ as the normal operation, where a value $L_d$ is determination value $V_d$. This results in a more improved accuracy of abnormality diagnosis than that of the comparative example.

Figure 24:
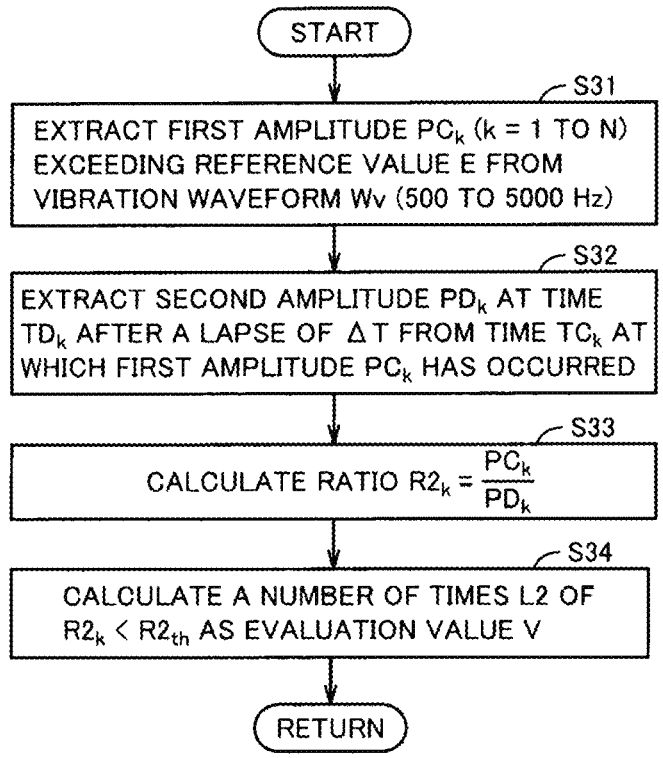
FIG. 24 is a flowchart for illustrating a process of a subroutine for calculating an evaluation value used in Embodiment 3.

FIG. 24 is a flowchart for illustrating the process (S1 in FIG. 2) of the subroutine for calculating an evaluation value V used in Embodiment 3. As shown in FIG. 24, data processor 80C extracts a first amplitude $PC_k$ (k=1 to N) exceeding reference value E from vibration waveform Wv (500 to 5000 Hz) in S31, and then advances the process to S32. Data processor 80C extracts a second amplitude $PD_k$ at a time $TD_k$ after a lapse of a period of time $\Delta T$ from a time $TC_k$ at which first amplitude $PC_k$ has occurred in S32, and then advances the process to S33. Data processor 80C calculates a ratio $R2_k = PC_k/PD_k$ obtained by dividing first amplitude $PC_k$ by second amplitude $PD_k$ in S33, and then advances the process to S34. Data processor 80C calculates a number of times L2 in which a ratio $R2_k$ falls below a threshold $R2_{th}$ as an evaluation value V in S34, and then returns the process to the main routine for abnormality diagnosis shown in FIG. 2. If evaluation value V is greater than determination value $V_d$, data processor 80C notifies the user of the occurrence of an abnormality. Threshold $R2_{th}$ can be appropriately determined by simulation or by actual machine experiment.

In Embodiment 3, as described above, a number of time L2 in which ratio $R2_k$, obtained by dividing first amplitude $PC_k$ of not smaller than reference value E at vibration waveform Wv of 500 to 5000 Hz by second amplitude $PD_k$ at a vibration waveform after a lapse of period of time $\Delta T$ from time $TC_k$ at which first amplitude $PC_k$ has occurred, has fell below threshold $R2_{th}$ is used as the evaluation value in diagnosis of an abnormality of main shaft bearing 20. This enables an abnormality diagnosis focusing on a difference in the temporal waveform shape of a vibration caused by the collision of rolling element 28 with cage 26, inner race 22, outer race 24, or the like between during normal operation and during abnormal operation, resulting in an improved accuracy of diagnosing an abnormality of main shaft bearing 20.

Embodiment 4

Embodiment 3 has described the case in which a number of times in which the value, obtained by dividing the first amplitude by the second amplitude at the vibration waveform after a lapse of a predetermined period of time from the time at which the first amplitude has occurred, is used as the evaluation value for determining whether there is an abnormality. The evaluation value for determining whether there is an abnormality may be any value calculated by dividing the first amplitude by the second amplitude at the vibration waveform after a lapse of a predetermined period of time from the time at which the first amplitude has occurred. Embodiment 4 will describe the case in which the occurrence frequency in which the value obtained by dividing the first amplitude by the second amplitude falls below a threshold is used as the evaluation value for determining whether there is an abnormality.

Embodiment 4 differs from Embodiment 3 in that the occurrence frequency in which the value obtained by dividing the first amplitude by the second amplitude falls below a threshold is used as the evaluation value for determining whether there is an abnormality. FIGS. 23 and 24 of Embodiment 3 are replaced respectively by FIGS. 25 and 26 in Embodiment 4. The other components are similar to those of Embodiment 3, which will not be described repetitively.

Figure 25:
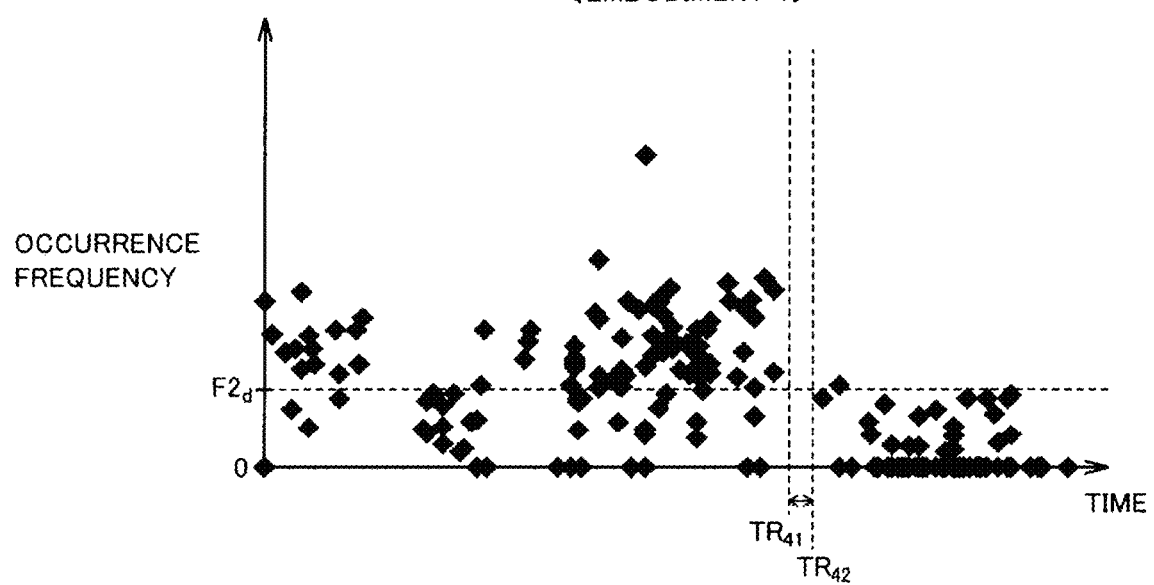
FIG. 25 shows changes in an occurrence frequency in which the value obtained by dividing a first amplitude by a second amplitude falls below the threshold.

FIG. 25 shows changes in the occurrence frequency in which the value obtained by dividing a first amplitude $PC_k$ by a second amplitude $PD_k$ falls below a threshold. In FIG. 25, up to a time $TR_{41}$ is a state in which there is an abnormality in main shaft bearing 20. Main shaft bearing 20 is replaced between time $TR_{41}$ and a time $TR_{42}$, and accordingly, main shaft bearing 20 is in normal operation at and after time $TR_{42}$. As shown in FIG. 25, a distinction can be made between during normal operation and during abnormal operation by, for example, determining the case in which evaluation value V exceeds determination value $V_d$ as the abnormal operation and the case in which evaluation value V is not greater than determination value $V_d$ as the normal operation, where a value $F2_d$ is determination value $V_d$. This results in a more improved accuracy of abnormality diagnosis than that of the comparative example.

Figure 26:
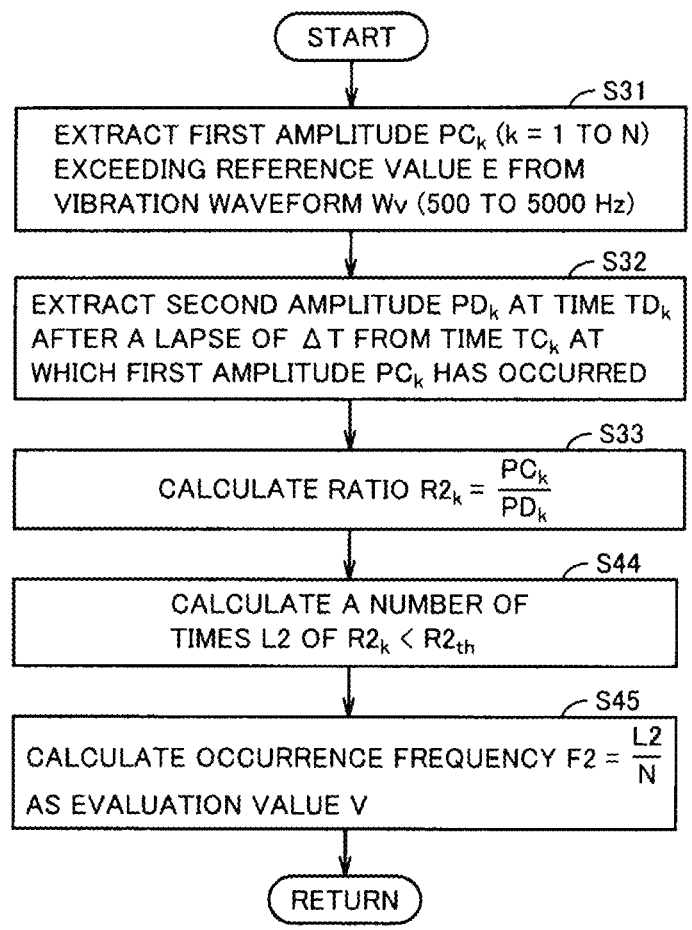
FIG. 26 is a flowchart for illustrating a process of a subroutine for calculating an evaluation value used in Embodiment 4.

FIG. 26 is a flowchart for illustrating the process (S1 of FIG. 2) of the subroutine for calculating an evaluation value V used in Embodiment 4. As shown in FIG. 26, data processor 80C extracts a first amplitude $PC_k$ (k=1 to N) exceeding reference value E from a vibration waveform Wv (500 to 5000 Hz) in S31, and then advances the process to S32. Data processor 80C extracts a second amplitude $PD_k$ at a time $TD_k$ after a lapse of a period of time ΔT from a time $TC_k$ at which first amplitude $PC_k$ has occurred in S32, and then advances the process to S33. Data processor 80C calculates a ratio $R2_k$ obtained by dividing first amplitude $PC_k$ by second amplitude $PD_k$ in S33, and then advances the process to S44. Data processor 80C calculates a number of times L2 in which ratio $R2_k$ falls below threshold $R2_{th}$ in S44, and then advances the process to S45. Data processor 80C calculates an occurrence frequency F2=L2/N in which ratio $R2_k$ falls below threshold $R2_{th}$ in S45, and then returns the process to the main routine for performing an abnormal diagnosis shown in FIG. 2. If evaluation value V is greater than determination value $V_d$, data processor 80C notifies the user that there is an abnormality.

In Embodiment 4, as described above, an occurrence frequency F2 in which ratio $R2_k$ obtained by dividing first amplitude $PC_k$ of not smaller than reference value E at a vibration waveform Wv of 500 to 5000 Hz by second amplitude $PD_k$ at the waveform after a lapse of a period of time ΔT from a time $TC_k$ at which first amplitude $PC_k$ has occurred, is used as the evaluation value in diagnosing an abnormality of main shaft bearing 20. This enables an abnormality diagnosis focusing on a difference in the temporal waveform shape of a vibration caused by the collision of rolling element 28 with cage 26, inner race 22, outer race 24, or the like between during normal operation and during abnormal operation, resulting in an improved accuracy of diagnosing an abnormality of main shaft bearing 20.

FIG. 27 shows the results of a significant test conducted on the respective evaluation values of the comparative example, Embodiment 3, and Embodiment 4 according to the t-test. The t-test is a test method of determining whether there is a significant difference between an average of a sample group and an average of another sample group. With reference to FIG. 27, whether there is a significant difference between an average of the evaluation value when there is damage to main shaft bearing 20 and an average of the evaluation value when there is no damage to main shaft bearing 20 was determined. The sample size of each group is 21. A t-value that is a boundary value for determining whether there is a significant difference is 2.021. A significant difference is found when the result of the t-test exceeds 2.021.

As shown in FIG. 27, no significant difference is found in the comparative example because the detection result is 0.274, which is smaller than the t-value. In contrast, a significant difference is found in Embodiments 3 and 4 because the detection results are respectively 2.09 and 6.01, both of which exceed the t-value.

The results of the significant test reveal that a difference is more likely to occur between the evaluation value when there is no abnormality in main shaft bearing 20 and the evaluation value when there is an abnormality in main shaft bearing 20 in Embodiments 3 and 4 than in the comparative example in which the effective value is used as the evaluation value. Thus, the occurrence of an abnormality is more likely to appear as the change in evaluation value in Embodiments 3 and 4 than in the comparative example. Embodiments 3 and 4 can thus achieve an improved accuracy of abnormality diagnosis compared with the comparative example.

Practice of an appropriate combination of the embodiments disclosed herein is also contemplated. It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 wind turbine generator, 10 main shaft, 20 main shaft bearing, 22 inner race, 24 outer race, 26 cage, 28 rolling element, 30 blade, 40 speed-up gear, 50 power generator, 70, 70C accelerometer, 80, 80C data processor, 81, 81C, 82 filter, 83, 83C diagnosis unit, 84, 84C notification unit, 90 nacelle, 100 tower.

The invention claimed is:

1. An abnormality diagnosis device that detects damage to a bearing device based on vibration data on acceleration of the bearing device, the abnormality diagnosis device comprising:
a first filter configured to extract a first vibration waveform belonging to a first frequency band from the vibration data;
a second filter configured to extract a second vibration waveform belonging to a second frequency band higher than the first frequency band from the vibration data; and
a processor programmed to:
identify a first amplitude that exceeds a first reference value from the first vibration waveform;
identify a second amplitude that appears in the second vibration waveform at a same time when the first amplitude appears in the first vibration waveform;

divide the first amplitude by the second amplitude to obtain an evaluation value;

determine that there is damage to the bearing device when the evaluation value exceeds a second reference value different from the first reference value; and cause generation of a notification notifying a user that there is damage to the bearing device.

2. The abnormality diagnosis device according to claim 1, wherein the processor is programmed to use, as the evaluation value, an average of a value obtained by dividing the first amplitude by the second amplitude at each of a plurality of times included in a period of measurement of the vibration data.

3. The abnormality diagnosis device according to claim 1, wherein the processor is programmed to use, as the evaluation value, a value obtained by dividing a number of times in which a value obtained by dividing the first amplitude by the second amplitude has exceeded a threshold in a period of measurement of the vibration data by a number of times in which the first amplitude has occurred during the period of measurement.

4. An abnormality diagnosis method of detecting damage to a bearing device based on vibration data on acceleration of the bearing device, the method comprising:

extracting a first vibration waveform belonging to a first frequency band from the vibration data;

extracting a second vibration waveform belonging to a second frequency band higher than the first frequency band from the vibration data;

identifying a first amplitude that exceeds a first reference value from the first vibration waveform;

identifying a second amplitude that appears in the second vibration waveform at a same time when the first amplitude appears in the first vibration waveform;

dividing the first amplitude by the second amplitude to obtain an evaluation value; and determining that there is damage to the bearing device when the evaluation value exceeds a second reference value different from the first reference value; and causing generation of a notification notifying a user that there is damage to the bearing device.

5. An abnormality diagnosis device that detects damage to a bearing device based on vibration data on acceleration of the bearing device, the abnormality diagnosis device comprising:

a filter configured to extract a vibration waveform belonging to a predetermined frequency band from the vibration data; and a processor programmed to:

identify a first amplitude that exceeds a first reference value from the vibration waveform;

identify a second amplitude that appears in the vibration waveform after a predetermined time period has elapsed since the first amplitude appeared in the vibration waveform;

divide the first amplitude by the second amplitude to obtain an evaluation value; and determine that there is damage to the bearing device when the evaluation value exceeds a second reference value different from the first reference value; and cause generation of a notification notifying a user that there is damage to the bearing device.

6. The abnormality diagnosis device according to claim 5, wherein the processor is programmed to calculate, as the evaluation value, a number of times in which a value obtained by dividing the first amplitude by the second amplitude exceeds a threshold during a period of measurement of the vibration data.

7. The abnormality diagnosis device according to claim 5, wherein the processor is programmed to calculate, as the evaluation value, a value obtained by dividing a number of times in which a value obtained by dividing the first amplitude by the second amplitude exceeds a threshold by a number of times in which the first amplitude has occurred during a period of measurement of the vibration data.

* * * * *